(12) United States Patent  
Adachi

(10) Patent No.: US 12,147,723 B2  
(45) Date of Patent: Nov. 19, 2024

(54) NON-TRANSITORY TANGIBLE STORAGE DEVICE, SUBTITLE DISPLAY PROCESSING DEVICE, AND SERVER

(71) Applicant: VoiceApp Inc., Tokyo (JP)

(72) Inventor: Yosuke Adachi, Tokyo (JP)

(73) Assignee: VoiceApp Inc., Tokyo (JP)

( * ) Notice: Subject to any disclaimer, the term of this patent is extended or adjusted under 35 U.S.C. 154(b) by 0 days.

(21) Appl. No.: 17/685,327

(22) Filed: Mar. 2, 2022

(65) Prior Publication Data

US 2022/0342623 A1  Oct. 27, 2022

(51) Int. Cl.
| | |
|---|---|
| *G06F 3/14* | (2006.01) |
| *G06F 3/04845* | (2022.01) |
| *G06T 3/20* | (2006.01) |
| *G06T 3/40* | (2006.01) |
| *G10L 15/26* | (2006.01) |
| *H04N 5/278* | (2006.01) |
| *G06V 40/16* | (2022.01) |

(52) U.S. Cl.
CPC ............ *G06F 3/14* (2013.01); *G06F 3/04845* (2013.01); *G06T 3/20* (2013.01); *G06T 3/40* (2013.01); *G10L 15/26* (2013.01); *H04N 5/278* (2013.01); *G06T 2200/24* (2013.01); *G06V 40/174* (2022.01)

(58) Field of Classification Search
CPC ..... G06F 3/13; G06F 3/04845; G06V 40/174; G06T 3/20; G06T 3/40; G06T 2200/24; G10L 15/26; H04N 5/278
See application file for complete search history.

(56) References Cited

U.S. PATENT DOCUMENTS

| | | | | |
|---|---|---|---|---|
| 9,292,161 | B2* | 3/2016 | Carter | ................. G06F 3/04812 |
| 2014/0376872 | A1* | 12/2014 | Lipetz | .................... G11B 27/10 |
| | | | | 386/201 |
| 2015/0134323 | A1* | 5/2015 | Cuthbert | ................ G06V 20/20 |
| | | | | 704/3 |
| 2021/0020142 | A1 | 1/2021 | Ooi et al. | |
| 2021/0201953 | A1* | 7/2021 | Takahashi | ............ G11B 27/031 |

FOREIGN PATENT DOCUMENTS

| | | | |
|---|---|---|---|
| JP | 2003-085572 A | | 3/2003 |
| JP | 200385572 A | * | 3/2003 |
| JP | 2015005129 A | * | 1/2015 |
| JP | 2017-117377 A | | 6/2017 |
| JP | 2019-16206 A | * | 1/2019 |
| JP | 2019-016206 A | | 1/2019 |
| WO | 2019/181488 A1 | | 9/2019 |

OTHER PUBLICATIONS

Japan Patent Office, Notice of Reasons for Refusal, Japanese Patent Application No. JP2021-033839, Issued Feb. 1, 2022.

* cited by examiner

*Primary Examiner* — Michelle L Sams

(74) *Attorney, Agent, or Firm* — Wiggin and Dana LLP

(57) ABSTRACT

A subtitle display processing device, a server, and a non-transitory tangible storage medium that stores a program are provided. The subtitle display processing device includes: a data outputter configured to output text data; a display setter configured to set a display position and a display size of a text display area; an indicator configured to display the text data in the text display area; and a changer configured to change at least one of the display position and the display size of the text display area in accordance with a preset change condition.

12 Claims, 28 Drawing Sheets

NON-TRANSITORY TANGIBLE STORAGE DEVICE, SUBTITLE DISPLAY PROCESSING DEVICE, AND SERVER

CROSS-REFERENCE TO RELATED APPLICATIONS

This application claims the benefit of Japanese Patent Application No. 2021-033839 filed on Mar. 3, 2021 with the Japan Patent Office, the entire disclosure of which is incorporated herein by reference.

BACKGROUND

The present disclosure relates to a non-transitory tangible storage medium, a subtitle display processing device, and a server. The non-transitory tangible storage medium stores a program to display a subtitle display area including text data.

Japanese Unexamined Patent Application Publication No. 2019-16206 discloses a technique for recognizing a speaker's voice by voice recognition and displaying the recognized voice as a text in a text display area on a display screen.

Even in a web conference where voice calls and video transmissions and receptions are made to each other using electronic devices such as PCs connected to the Internet, by displaying the voice-recognized text, users such as the audience who listen to the speaker can recognize what the speaker is saying by hearing as well as by sight with the text.

SUMMARY

However, in a web conference or the like, the speaker sometimes talks about a content of a material while instructing the audience to refer to their own PC screens. If a text on the screen to which the user as the audience is referring and a text representing what the speaker is saying overlap, it is difficult for the user to visually recognize the text on the screen.

On the other hand, if the speaker operates a subtitle display area where the text is displayed, the speaker must operate the subtitle display area where the text is displayed in parallel with an explanation or the like to the audience. It is difficult for the speaker to perform the explanation and the operation in parallel.

In one aspect of the present disclosure, it is desirable to provide a technique for making it easier for a speaker to see a display screen that includes a subtitle display area while talking in a web conference or the like.

Means to Solve the Problems

One aspect of the present disclosure is a non-transitory tangible storage medium that stores a program to cause a computer to function as a data outputter, a display setter, an indicator, and a changer. The data outputter outputs text data by at least one of a voice recognition function and a translation function. The voice recognition function outputs voice data as a text. The translation function translates the voice-recognized data and outputs the translated data. The display setter sets a display position and a display size of a text display area on a display screen which is an area to display the text data outputted from the data outputter. The indicator displays the text data outputted from the data outputter in the text display area. The changer changes at least one of the display position and the display size of the text display area set by the display setter in accordance with a preset change condition.

With the configuration as above, at least one of the display position and the display size of the text display area is changed in accordance with the preset change condition. Thus, the display screen where the text display area is displayed can be easy to see.

The program may further cause the computer to function as a subtitle display mode changer that changes at least one of a display mode of the text display area and a display mode of the text data displayed in the text display area, based on a speaker's facial expression acquired by a specific image capturer.

With the configuration as above, the display mode is changed based on the speaker's facial expression, and thus a display can be made in accordance with the speaker's facial expression. Further, a user who sees the display can recognize the speaker's emotion.

In one aspect of the present disclosure, the program may cause the computer to function as a balloon indicator and a balloon display mode changer. The balloon indicator displays a balloon display area. The balloon display area is displayed in an area different from the text display area. The balloon display area is a preset area further divided in accordance with a preset rule. The balloon display mode changer changes at least one of a display mode of the balloon display area and a display mode of the text data displayed in the balloon display area. Moreover, the balloon display mode changer may change the display mode of the balloon display area and the display mode of the text data displayed in the balloon display area, based on a speaker's facial expression acquired by a specific image capturer.

With the configuration as above, at least one of the display mode of the balloon display area which is displayed in the area different from the text display area, and the display mode of the text data displayed in the balloon display area is changed in accordance with the speaker's facial expression. Specifically, the display mode can be changed in accordance with the speaker's facial expression. This enables the user who sees the display to recognize the speaker's emotion.

In one aspect of the present disclosure, the changer may change at least one of the display position and the display size of the text display area so that the text display area is displayed in an area different from a position of a mouse pointer displayed on the display screen.

With the configuration as above, the text display area is displayed in the area different from the position of the mouse pointer. Thus, a position of the text display area can be changed by operation of a mouse to move the position of the mouse pointer.

In one aspect of the present disclosure, the program may cause the computer to further function as a button indicator that displays a switch display button associated with the display position and the display size of the text display area on the display screen. The changer may change the position and the size of the text display area to the display position and the display size associated with the selected switch display button.

With the configuration as above, the position and the size of the text display area is changed to the display position and the display size associated with the switch display button by operation of the switch display button. This can change the position and the size of the text display area, and make the display screen where the text display area is displayed easy to see.

In one aspect of the present disclosure, the program may cause the computer to further function as a background text acquirer that acquires background text data that includes a text contained in background data displayed on the display screen and data of the display position of the text. The changer may change at least one of the display position and the display size of the text display area, so that the text display area is displayed in an area different from the area where the background text data matching a content of the text data before displayed in the text display area is displayed.

With the configuration as above, if the background text data that includes the text contained in the background data displayed on the display screen and the data of the display position of the text matches the content of the text data displayed in the text display area, at least one of the display position and the display size of the text display area is changed so that the display screen can be easy to see.

In one aspect of the present disclosure, the program may cause the computer to function as a background color acquirer and a display mode changer. The background color acquirer acquires a background color of a position where the text display area overlaps. The display mode changer changes transparency of the text display area in accordance with the background color acquired by the background color acquirer.

With the configuration as above, transparency of the text display area is changed in accordance with the background color acquired by the background color acquirer. Thus, the text display area can be easy to see. Although the features of the program have been described, one aspect of the present disclosure should be understood as a non-transitory tangible storage medium that stores the aforementioned program.

One aspect of the present disclosure is a subtitle display processing device comprising a data outputter, a display setter, an indicator, and a changer. The data outputter is configured to output text data by at least one of a voice recognition function and a translation function. The voice recognition function outputs voice data as a text. The translation function translates the voice-recognized data and outputs the translated data. The display setter is configured to set a display position and a display size of a text display area on a display screen. The text display area is an area to display the text data outputted from the data outputter. The indicator is configured to display the text data outputted from the data outputter in the text display area. The changer is configured to change at least one of the display position and the display size of the text display area set by the display setter in accordance with a preset change condition.

With the subtitle display processing device configured as above, at least one of the display position and the display size of the text display area is changed in accordance with the preset change condition. Thereby, a portion where the text display area overlaps is changed. Thus, the display screen where the text display area is displayed can be easy to see.

In one aspect of the present disclosure, the indicator may display the text data in the text display area on the display screen provided to the subtitle display device and another device that communicates with the subtitle display device.

With the configuration as above, on the display screen of the subtitle display device and another device that communicates with the subtitle display device, at least one of the display position and the display size of the text display area where the text data is displayed by the indicator is changed in accordance with the change condition. Thereby, a portion where the text display area overlaps is changed. Thus, the display screen where the text display area is displayed can be easy to see.

One aspect of the present disclosure is a server connected to at least one terminal in a communicable manner. The server comprises a data outputter, a display setter, an indicator, and a changer. The data outputter is configured to output text data by at least one of a voice recognition function and a translation function. The voice recognition function outputs voice data acquired from the at least one terminal as a text. The translation function translates the voice-recognized data and outputs the translated data. The display setter is configured to set a display position and a display size of a text display area on a display screen provided to the at least one terminal. The text display area is an area to display the text data outputted from the data outputter. The indicator is configured to display the text data outputted from the data outputter in the text display area. The changer is configured to change at least one of the display position and the display size of the text display area set by the display setter in accordance with a preset change condition.

With the configuration as above, at least one of the display position and the display size of the text display area where the text data outputted based on voice data acquired from the at least one terminal that communicates with the server is displayed is changed. Thereby, a portion where the text display area overlaps is changed. Thus, the display screen where the text display area is displayed can be easy to see.

In one aspect of the present disclosure, the server may further comprise a log transmitter. The log transmitter transmits a log representing a content displayed by the indicator to a specific external terminal by a communicator.

With the configuration as above, a log representing the content displayed by the indicator can be acquired by communicating with the server using the external terminal.

BRIEF DESCRIPTION OF THE DRAWINGS

An embodiment of the present disclosure will be described hereinafter with reference to the drawings.

DETAILED DESCRIPTION OF EXEMPLARY EMBODIMENTS

[1. Configuration]

An example of a subtitle display processing system 1 of the present embodiment will be described with reference to the drawings. The subtitle display processing system 1 is a system for two or more terminals 100 to transmit information to each other using voice, video and display via a communication network. For example, the subtitle display processing system 1 may be a system used in a so-called web conference.

The subtitle display processing system 1 of the present embodiment is not limited to those used to hold a web conference, and may be used, for example, for video and voice delivery using a communication network such as a videophone and a streaming service.

Figure 1:
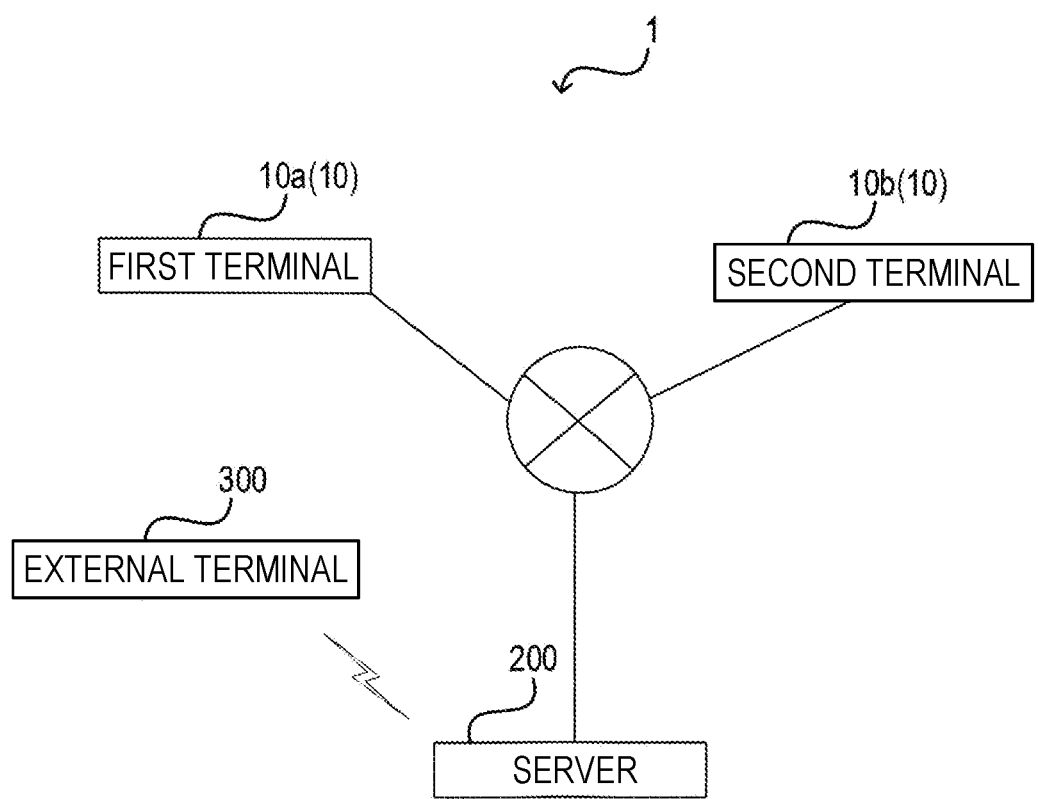
FIG. 1 A schematic diagram showing an example of a configuration of a subtitle display processing system.

FIG. 1 is a schematic diagram of a configuration of the subtitle display processing system 1.

As shown in FIG. 1, the subtitle display processing system 1 of the present embodiment comprises the terminals 100 and a server 200. The subtitle display processing system 1 of the present embodiment can further communicate with an external terminal 300.

In the present embodiment, the subtitle display processing system 1 comprises two terminals 100. Hereinafter, the respective terminals 100, when distinguished from each other, will be also described as a first terminal 100a and a second terminal 100b. Although the present embodiment describes an example in which the subtitle display processing system 1 comprises two terminals 100, the subtitle display processing system 1 may comprise three or more terminals 100. The terminal 100 herein can communicate with another terminal 100 such as a PC using a communication network. The communication network herein is the Internet.

The server 200 is a computer that operates to implement a function to provide a specified service in response to a request transmitted from the terminal 100 via the communication network. The function provided by the server 200 in the present embodiment at least includes a display function based on voice recognition or the like in a web conference and so on. In the present embodiment, a display based on voice recognition or the like is made on a screen of the terminal 100 participating a web conference in an overlapping manner.

The external terminal 300 acquires a content displayed based on voice recognition or the like in a web conference. In the present embodiment, the external terminal 300 is a tablet terminal. The external terminal 300 is not limited to a tablet terminal, and may be a so-called smartphone. The external terminal 300 may be a PC having a communication function.

Figure 2:
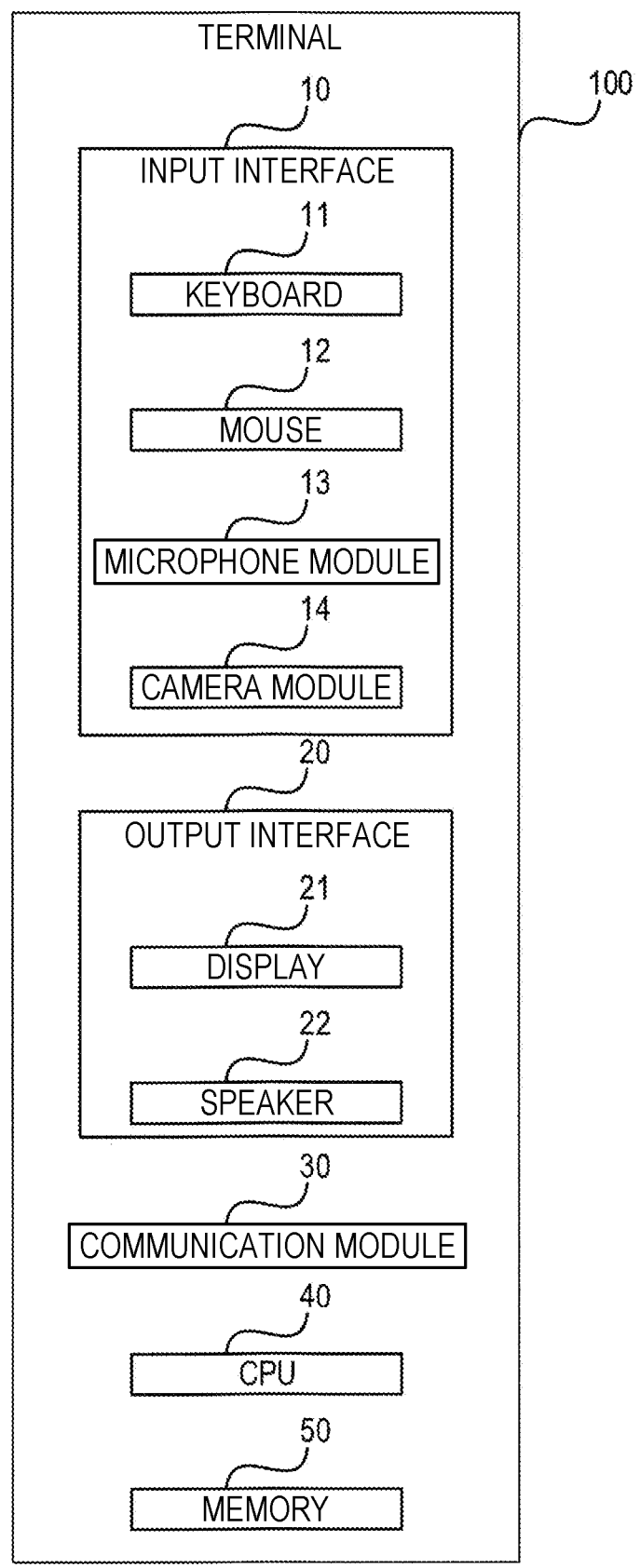
FIG. 2 A diagram showing an example of a hardware configuration of a terminal.

FIG. 2 is a diagram showing an example of a hardware configuration of the terminal 100.

As shown in FIG. 2, the terminal 100 comprises an input interface 10, an output interface 20, a communication module 30, a CPU 40, and a memory 50.

The input interface 10 is an interface for inputting information and operation to the terminal 100.

The input interface 10 comprises a keyboard 11, a mouse 12, a microphone module 13, and a camera module 14.

The keyboard 11 is generally used as an input device for a PC. The keyboard 11 is used to input a text and an operation to the terminal 100 by so-called typing.

The mouse 12 is generally used as an input device for a PC.

The mouse 12 is used to perform operations including click operation, pointing operation and drag operation on the terminal 100. Click operation herein is an operation to depress a button arranged on the mouse 12. Pointing operation is an operation to position a cursor of the mouse 12 displayed on a display at a desired position. Drag operation is an operation to move a position of a mouse pointer P while depressing the button arranged on the mouse 12.

The microphone module 13 is used to input voice to the terminal 100.

The camera module 14 is used to capture video, and input the captured video to the terminal 10. The camera module 14 in the present embodiment is arranged in a direction to capture the face of a user of the terminal 100. Specifically, the camera module 14 is arranged to face a direction in which a display screen D of a later described display 21 faces.

The output interface 20 is used to output voice, display, etc. from the terminal 100.

The output interface 20 comprises the display 21 and a speaker 22.

The display 21 outputs a display in accordance with an inputted video signal.

The speaker 22 outputs voice.

The communication module 30 is used for communication with other devices. The communication module 30 enables communication with another terminal 100 and the external terminal 300 via a communication network. The communication network herein is the Internet.

The CPU 40 executes a specified program. The CPU 40 at least executes a program stored in the memory 50. The CPU 40 also executes a program stored in the server 200 via the communication network.

The memory 50 is a storage medium that stores various information. The memory 50 includes the program executed by the CPU 40.

The input interface 10, the output interface 20, the communication module 30, the CPU 40 and the memory 50 provided in the terminal 100 may be detachable.

Figure 3:
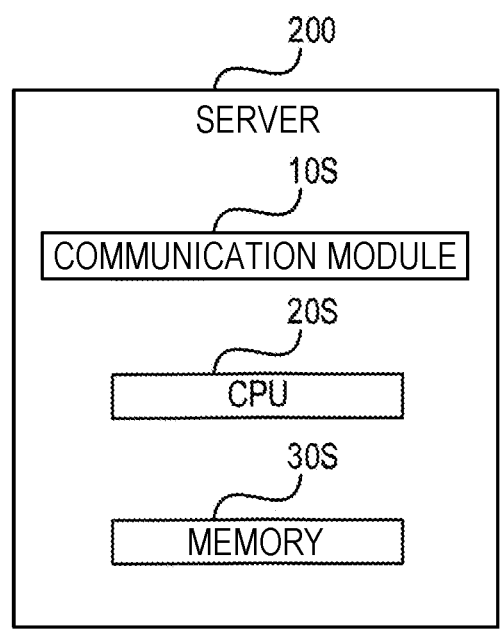
FIG. 3 A diagram showing an example of a hardware configuration of a server.

FIG. 3 is a diagram showing an example of a hardware configuration of the server 200.

The server 200 of the present embodiment comprises a communication module 10S, a CPU 20S, and a memory 30S.

The communication module 10S is used for communication with the terminals 100 via the communication network. The communication module 10S and the terminals 100 are communicable via the Internet.

The CPU 20S executes a specified program. The CPU 20S at least executes a program stored in the CPU 20S. The CPU 20S also executes a program in response to requests from the terminals 100.

The memory 30S is a storage medium that stores various information. The memory 30S stores the program executed by the CPU 20S. The memory 30S may store programs executed in response to the requests from the terminals 100. The programs stored in the memory 30S include a subtitle display processing program for executing a later-described display process.

Figure 4:
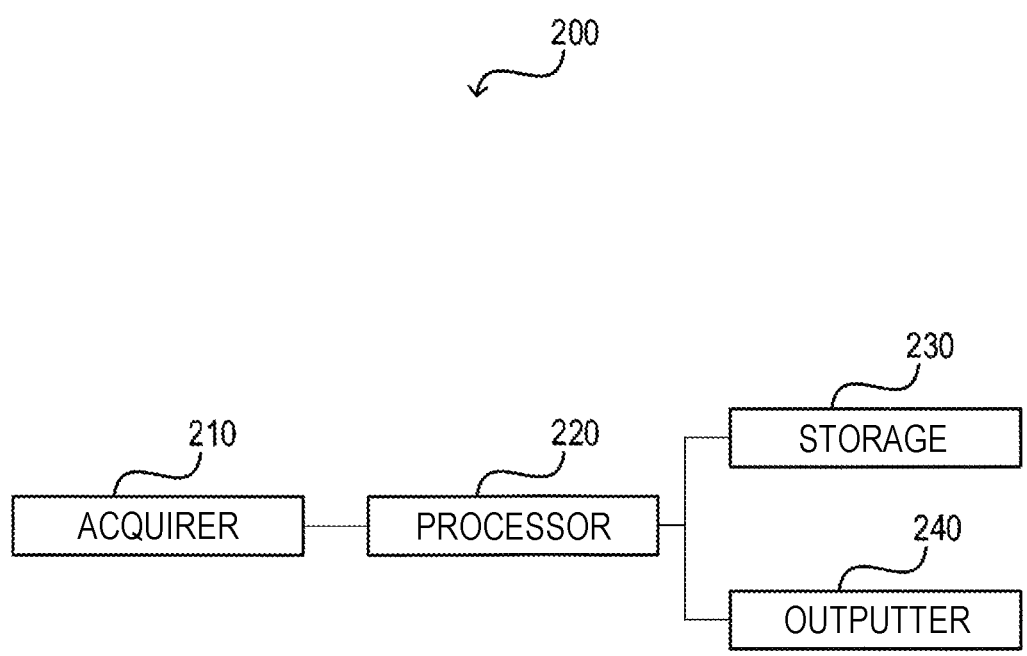
FIG. 4 A diagram showing an overview example of functional components of the server.

FIG. 4 is a diagram showing an overview example of functional components of the server 200.

As shown in FIG. 4, the server 200 comprises an acquirer 210, a processor 220, a storage 230, an outputter 240, and a log transmitter 250 as the functional components. In the present embodiment, respective functions of the functional components of the server 200 are implemented by the program executed by the CPU 20S.

The acquirer 210 acquires information from the terminals 100 included in the subtitle display processing system 1 using the communication module 10S.

The processor 220 executes a process based on the information acquired by the acquirer 210.

The storage 230 stores a result of the process by the processor 220.

The outputter 240 outputs the result of the process by the processor 220 using the communication module 10S.

The log transmitter 250 transmits a log window w5 as a log to the external terminal 300. The log window w5 corresponds to a record of a subtitle display area w2 transmitted to the terminal 100. In the present embodiment, the communication module 10S is used for log transmission to the external terminal 300 by the log transmitter 250.

Figure 5:
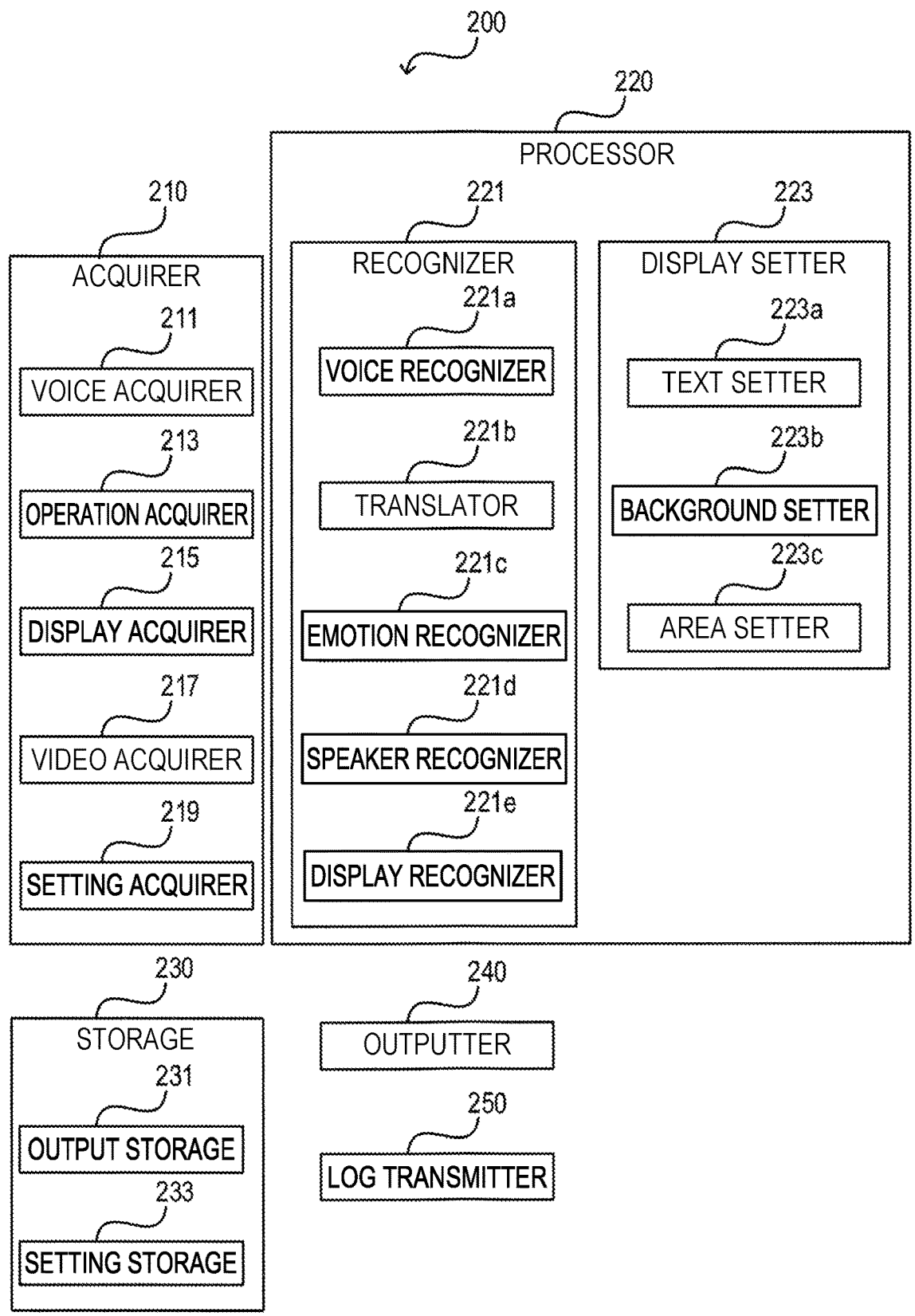
FIG. 5 A diagram showing a detailed example of the functional components of the server.

FIG. 5 is a diagram showing a detail of the functional components of the server 200.

The acquirer 210 comprises a voice acquirer 211, an operation acquirer 213, a display acquirer 215, a video acquirer 217, and a setting acquirer 219 as functional components.

The voice acquirer 211 acquires information on voice from the terminal 100 of the subtitle display processing system 1 using the communication module 10S. Specifically, the voice acquirer 211 acquires information on the voice inputted to each terminal 100. For example, the voice acquirer 211 acquires voice, etc. of the user inputted using the microphone module 13 provided in the terminal 100.

The operation acquirer 213 acquires information on operation inputted to the terminal 100 of the subtitle display processing system 1 using the communication module 10S. For example, the operation acquirer 213 acquires the operation by the user inputted using the keyboard 11 and the mouse 12 provided in the terminal 100.

The display acquirer 215 acquires display information which is information related to a display on the display 21 of the terminal 100 using the communication module 10S. The display information includes information on the display on the display 21 and information on the content displayed on the display 21. The information on the display 21 includes, for example, information on the size, number, and resolution of the display, and the number of displayable colors. The information on the display 21 may be those included in data of EDID, for example. EDID is an abbreviation of Extended Display Identification Data.

The information on the content displayed on the display 21 represents information outputted as image or video on the display 21, and includes the display of texts and figures. The information on the content displayed on the display 21 also includes information on the background color of the display screen D of the display 21 and the displayed text. The information on the content displayed on the display 21 may be detected via an API of an OS executing a software displaying the window, for example. OS is an abbreviation of Operating System. API is an abbreviation of Application Programming Interface.

The video acquirer 217 acquires information on video inputted to the terminal 100 of the subtitle display processing system 1 using the communication module 10S. For example, the video acquirer 217 acquires information on the video captured by the camera module 14 provided in the terminal 100 and inputted to the terminal 100.

The setting acquirer 219 acquires setting information set in the terminal 100 of the subtitle display processing system 1 using the communication module 10S.

In the present embodiment, the setting information is set by the user of the terminal 100 performing operations using the keyboard 11 and the mouse 12 on a setting display w4 displayed on the display screen D of the terminal 100.

Figure 6:
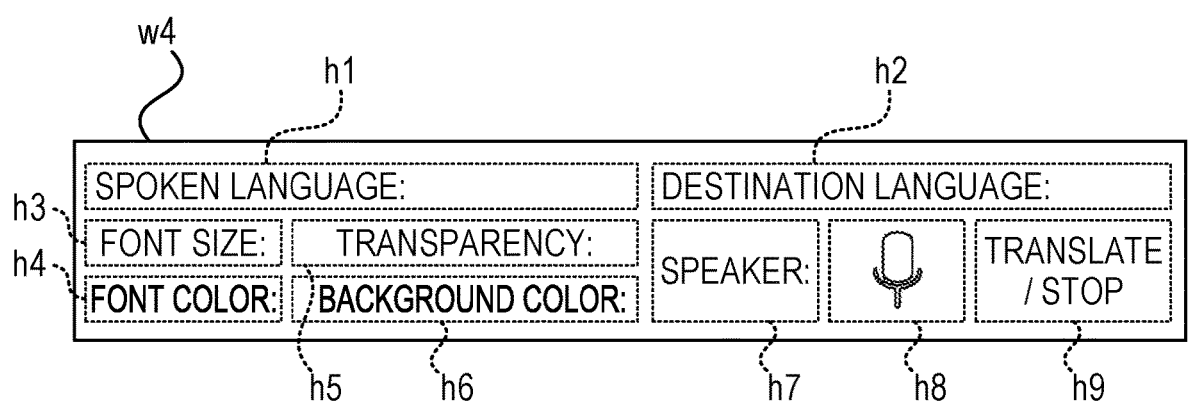
FIG. 6 A diagram showing an example of a setting display.

FIG. 6 shows an example of the setting display w4.

As shown in FIG. 6, the setting display w4 comprises a recognition language setting button h1, a translation language button h2, a font size setting button h3, a font color setting button h4, a transparency setting button h5, a background color setting button h6, a speaker setting button h7, a mute button h8, and a translate/stop button h9.

The recognition language setting button h1 is a button to set a language subject to voice recognition in advance. When the recognition language setting button h1 is clicked, various language options such as "Japanese", "English", "Chinese", etc. are displayed. Click selection of the language spoken by the speaker from among the displayed language options in advance sets the language subject to voice recognition. When the language subject to voice recognition is set, the result of the voice recognition is displayed in the selected language on a voice recognition display a2.

The translation language button h2 is a button to set a destination language after the inputted voice is translated. When the translation language button h2 is clicked, various language options such as "Japanese", "English", "Chinese", etc. are displayed. Click selection of the language to translate to from among the displayed language options sets the destination language. When the destination language is set, the voice-recognized content is translated and displayed in the selected language on a translation display a3.

The font size setting button h3 is a button used to set a font size of the text displayed on a speaker display a1, the voice recognition display a2 and the translation display a3. When the font size setting button h3 is clicked, buttons representing the font sizes such as "10 pt", "15 pt", "20 pt" and the like are displayed. Click selection of any one of the buttons sets the font size of the text displayed on the speaker display a1, the voice recognition display a2 and the translation display a3 to the size corresponding to the selected button.

The font color setting button h4 is a button used to set a font color of the text displayed on the speaker display a1, the voice recognition display a2 and the translation display a3. When the font color setting button h4 is clicked, buttons representing the font colors such as red, blue, green and the like are displayed. Click selection of any one of the buttons sets the font color of the text displayed on the speaker display a1, the voice recognition display a2 and the translation display a3 to the color corresponding to the selected button. The buttons representing the font colors may have the corresponding font colors.

The transparency setting button h5 is a button used to set a transparency of the background of the subtitle display area w2 displayed on the speaker display a1, the voice recognition display a2 and the translation display a3. When the transparency setting button h5 is clicked, buttons representing transparencies such as "20%", "50%", "70%" and the like are displayed. Click selection of any one of the buttons sets the transparency of the background of the subtitle display area w2 to the transparency corresponding to the selected button.

The background color setting button h6 is a button used to set a background color of the subtitle display area w2 displayed on the speaker display a1, the voice recognition display a2 and the translation display a3. When the background color setting button h6 is clicked, buttons representing the transparency of such as red, blue, green and the like are displayed. Click selection of any one of the buttons sets the background color of the subtitle display area w2 to the color corresponding to the selected button. The buttons representing the background colors may have the corresponding colors. In addition, lighter colors or darker colors than the colors of the buttons selectably displayed with the font color setting button h4 may be selectably displayed for the background colors selectable with the background color setting button h6. Setting the background color selectable as such can inhibit the text from being buried in the background due to the background color and the font color being the same, even if the same color is selected.

The speaker setting button h7 is a button used to set a display per speaker. When the speaker setting button h7 is clicked, buttons representing selectable speakers are displayed. Click selection of any one of the buttons enables setting of the display of the speaker corresponding to the selected button. By default, for example, the user of the operating terminal 100 is selected. By setting the display with the recognition language setting button h1, the translation language button h2, the font size setting button h3, the font color setting button h4, the transparency setting button h5, the background color setting button h6, the mute button h8, and the translate/stop button h9 in a state in which the speaker is selected, the display of the subtitle display area w2 corresponding to the speaker is set.

When the mute button h8, similar to a mute icon c1, is clicked by the user, the terminal 100 enters a so-called mute state.

The translate/stop button h9 is a button to switch between execution and suspension of translation in the subtitle display area w2. In a state in which the translation is executed, the subtitle display area w2 includes the translation display a3, and the display is made in the destination language. On the other hand, in a state in which the translation is suspended, the translation display a3 is not included in the subtitle display area w2, and the display in the destination language is hidden. When the translation display a3 is hidden, the speaker display a1 and the voice recognition display a2 in the subtitle display area w2 may be set to be displayed larger as compared to the case where the translation display a3 is displayed.

A text input icon c5 is an icon that enables various text inputs. For example, when the user wants to add a text to the subtitle display area w2, clicking the icon may bring an inputtable mode. In the inputtable mode, selection of the subtitle display area w2 may add the text inputted in the subtitle display area w2 to the text displayed in the subtitle display area w2. The text already displayed in the subtitle display area w2 may be deletable using the keyboard 11.

The processor 220 comprises a recognizer 221 and a display setter 223 as functional components.

The recognizer 221 executes a specified process based on information on the voice, video and display acquired by the acquirer 210.

The recognizer 221 comprises a voice recognizer 221a, a translator 221b, an emotion recognizer 221c, a speaker recognizer 221d, and a display recognizer 221e.

The voice recognizer 221a performs voice recognition to the voice acquired by the voice acquirer 211. Voice recognition herein is to convert the voice acquired by the voice acquirer 211 to a text string corresponding to the voice. Voice recognition uses a voice recognition engine that uses artificial intelligence.

The translator 221b translates the voice acquired by the voice acquirer 211 to a specific language. Translation uses a translation engine that uses artificial intelligence. The translator 221b may directly translate the voice acquired by the voice acquirer 211, and may further translate a result of voice recognition by the voice recognizer 221a. In the present embodiment, the language translated by the translator 221b, that is, the destination language, may be acquired in advance by the setting acquirer 219.

The emotion recognizer 221c recognizes the emotion of the speaker of the terminal 100 from the speaker's voice acquired by the voice acquirer 211 and inputted to the terminal 100 and the speaker's facial expression included in the video acquired by the video acquirer 217 and inputted to the terminal 100. The speaker's emotion herein refers to four types of emotions, that is, delight, anger, sorrow and pleasure. The speaker's emotion is not limited to delight, anger, sorrow and pleasure, and may be classified into various emotions. The speaker's emotion is recognized from the pitch and volume of the speaker's voice. Emotion recognition by the speaker's facial expression uses a technique of artificial intelligence. Further, the highest part of the speaker's emotion is recognized from the speaker's facial expression and voice. In other words, in the emotion recognition, degrees of delight, anger, sorrow and pleasure may be recognized, and a part having a higher or lower degree of each emotion may be recognized. Specifically, it may be determined that the degree of delight, anger, sorrow or pleasure is particularly high at a part where the recognized voice is loud or where the movements of eyes and mouth are large as compared to an expressionless state.

The speaker recognizer 221*d* recognizes the speaker of the voice acquired by the voice acquirer 211. The speaker's recognition by the speaker recognizer 221*d* is based on the voice recognized by the voice recognizer 221*a*. The speaker's recognition is not limited to those based on the result of voice recognition by the voice recognizer 221*a*. For example, the speaker's recognition may be based on video of the user's face acquired by the video acquirer 217. Specifically, the speaker may be recognized from the face movement. Also, the speaker may be recognized based on the voice acquired by the voice acquirer 211. For example, in a case where the terminal 100 is assigned to each user, the user of the terminal 100 whose voice is recognized may be recognized as the speaker.

The display recognizer 221*e* recognizes the content displayed on the display screen D of the display 21 of the terminal 100.

Figure 7:
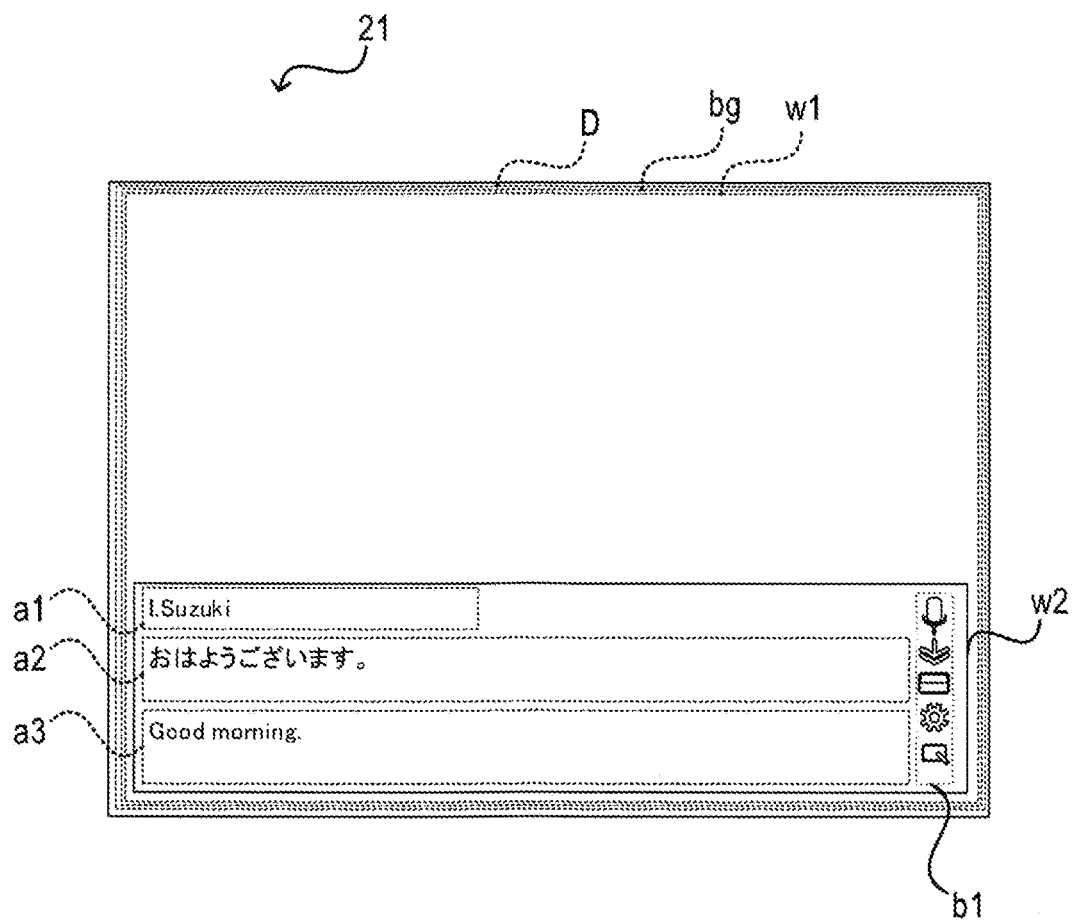
FIG. 7 A diagram showing an example of a display of a display screen set by a display setter.

The display setter 223 sets a display based on the content recognized by the recognizer 221. FIG. 7 is a diagram showing an example of the display of the display screen D set by the display setter 223.

A description will be given on the assumption that there are various displays on the display screen D of the display 21 as shown in FIG. 7. Specifically, a desktop background is displayed on the display screen D. In the present embodiment, a window w1 is displayed on the desktop background. The window w1 is displayed in so-called full screen on the desktop background.

The subtitle display area w2 set by the display setter 223 is set to be displayed on the display screen D and the displayed window w1.

The subtitle display area w2 set by the display setter 223 includes the speaker display a1, the voice recognition display a2, the translation display a3 and an icon area b1.

The speaker display a1 is an area to display the name of the speaker recognized by the speaker recognizer 221*d*. The name of the speaker displayed on the speaker display a1 may be displayed in alphabets, as shown in FIG. 7, or may be displayed in hiragana, katakana or kanji.

The voice recognition display a2 is an area to display the content recognized by the voice recognizer 221*a* of the voice acquired by the voice acquirer 211 as a text string.

The translation display a3 is an area to display the content translated to a specific language by the translator 221*b* of the voice acquired by the voice acquirer 211 as a text string.

Each of the speaker display a1, the voice recognition display a2, and the translation display a3 in the subtitle display area w2 is switched every time the recognized speaker changes. Also, displays of the speaker display a1, the voice recognition display a2, and the translation display a3 in the subtitle display area w2 are deleted, even if the same speaker is talking, when there is a specified blank time, and the speaker, the voice-recognized content, and the translated content are displayed anew on the speaker display a1, the voice recognition display a2, and the translation display a3, respectively. When the number of letters to be displayed on each of the voice recognition display a2 and the translation display a3 of the subtitle display area w2 exceed a preset number of letters, the displays on the voice recognition display a2 and the translation display a3 may be displayed in a scrollable manner. The displays may be controlled to reduce the font size so that a specified number of letters are displayed on the speaker display a1, the voice recognition display a2, and the translation display a3. Further, in case of reducing the font size of text, brightness of the color of the background of the subtitle display area w2 and the colors of the texts displayed in the speaker display a1, the voice recognition display a2, and the translation display a3 may be adjusted to make it easier to see. In the present embodiment, the brightness of the background color of the subtitle display area w2 is adjusted to be different from the brightness of the colors of the texts to a certain extent or more.

The icon area b1 is an area to display specified icons.

Figure 8:
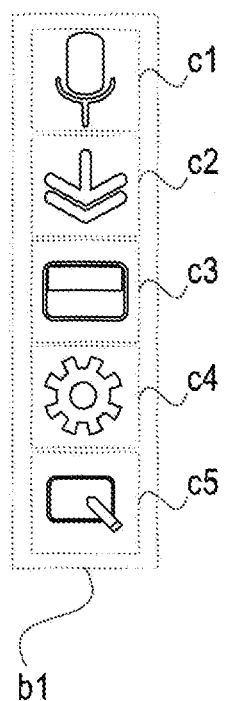
FIG. 8 A diagram showing an example of a display of an icon area.

FIG. 8 shows an example of a display of the icon area b1. As shown in FIG. 8, the icon area b1 includes multiple icons. Each of the icons is used to perform a corresponding function.

In the present embodiment, the multiple icons include the mute icon e1, a download icon c2, a position setting icon c3, a detail setting icon c4, and the text input icon c5.

The mute icon c1 is a button to turn on and off the mute state. Specifically, when the user clicks the mute icon c1 displayed on the display 21 of the terminal 100, the terminal 100 enters the so-called mute state. The mute state herein indicates a state in which transmission of the voice data acquired by the microphone module 13 arranged in the terminal 100 to the server 200 is suspended. In the mute state, the original state is restored, that is, the transmission of the voice data to the server 200 is restarted, by clicking the mute icon c1.

The download icon c2 is used to download the contents of the speaker display a1, the voice recognition display a2, and the translation display a3 displayed in the subtitle display area w2.

The position setting icon c3 is an icon used to adjust the position of the subtitle display area w2 on the display screen D of the terminal 100.

Figure 9:
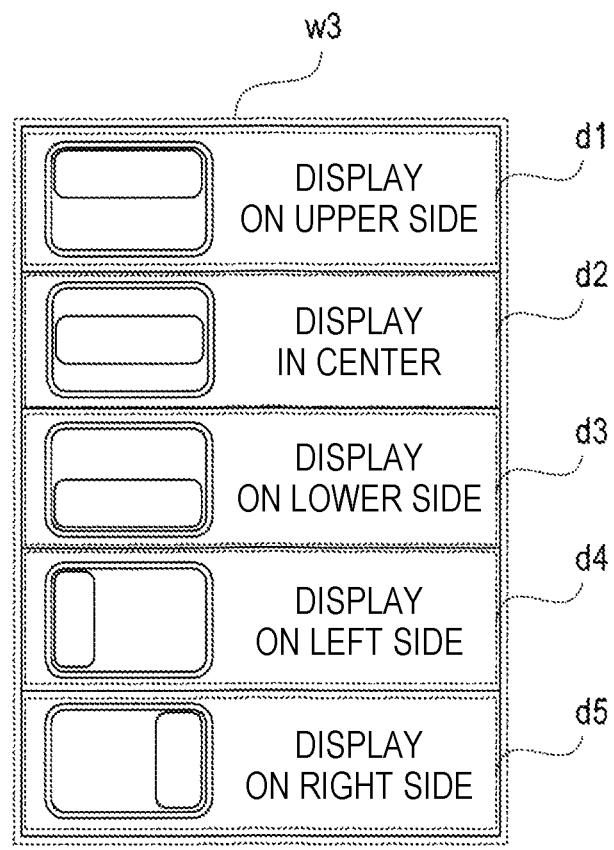
FIG. 9 A diagram showing an example of a display of a displayed position setting window.

Specifically, when the position setting icon c3 is clicked using the mouse 12 of the terminal 100, the position setting window w3 is displayed. FIG. 9 shows an example of the displayed position setting window w3. Multiple buttons are displayed in the position setting window w3. Switch display buttons d1, d2, d3, d4 and d5 are shown as examples of the buttons displayed in the position setting window w3.

The switch display buttons d1, d2, d3, d4 and d5 correspond to respective positions on the screen. Specifically, when the switch display button d1 is clicked, the subtitle display area w2 is displayed on the upper side of the display screen D. The upper side of the display screen D refers to the upper side when the display 21 is arranged. However, the upper side of the display screen D is not limited to the upper side when the display 21 is arranged. Specifically, on the display screen D, the upper side may refer to the side where the first line for inputting an image signal is located.

Similarly, when the switch display button d2 is clicked, the subtitle display area w2 is displayed in the center of the up-down directions of the display screen D. When the switch display button d3 is clicked, the subtitle display area w2 is displayed on the lower side of the display screen D. Further, when the switch display button d4 is clicked, the subtitle display area w2 is displayed on the left side of the display screen D. When the switch display button d5 is clicked, the subtitle display area w2 is displayed on the right side of the display screen D.

In the present embodiment, the right side refers to a range included in the right half of the display screen D, and the left side refers to a range included in the left half of the display screen D. The upper side refers to a range included in the upper third of the display screen D, the center refers to a range included in the center third of the display screen D, and the lower side refers to a range included in the lower third of the display screen D. When the subtitle display area w2 is moved to each position, the size of the subtitle display area w2 is changed so that the subtitle display area w2 is included in the corresponding range. The display of the subtitle display area w2 is not limited to those whose position and size are both changed. Only one of the position and size may be changed.

As above, the correspondence between the switch display buttons d1 to d5 and the positions to display the subtitle display area w2 corresponding to the switch display buttons d1 to d5 are described. However, the correspondence between each of the switch display buttons d1 to d5 and the position to display the subtitle display area w2 is not limited to the above correspondence. Specifically, for example, the positions to display the subtitle display area w2 by clicking the respective switch display buttons d1 to d5 may not be limited to the upper, lower, left, right, and center positions, and may be positions different from each other on the display screen D The detail setting icon c4 is an icon used, for example, to display the setting display w4 to set a display content of the subtitle display area w2. When the detail setting icon c4 is clicked, the setting display w4 is displayed.

The display setter 223 comprises a text setter 223a, a background setter 223b, an area setter 223c, and an icon setter 223d as functional components.

The text setter 223a sets a display mode such as the font size, font type and font color when displaying the content recognized by the voice recognizer 221a and the content translated by the translator 221b as text strings. The text setter 223a may set the display mode to display the content recognized by the voice recognizer 221a to be different from the display mode to display the content translated by the translator 221b. Specifically, the text setter 223a sets the display modes of the texts displayed on the voice recognition display a2 and the translation display a3.

The background setter 223b sets the background of the subtitle display area w2 where the content recognized by the voice recognizer 221a and the content translated by the translator 221b are displayed. The background color of the subtitle display area w2 set by the background setter 223b may be set based on the color of the desktop background of the terminal 100. Further, in the terminal 100, if a specified software is executed and the window w1 is displayed based on the executed software, the background color may be set based on colors included in the displayed window w1. In other words, the background color of the subtitle display area w2 set by the background setter 223b may be set based on a color range of the window w1 which the subtitle display area w2 overlaps.

Specifically, an inverted color of the color in the overlapping color range of the window w1 may be set as the background color of the subtitle display area w2. Also, the background color of the subtitle display area w2 set by the background setter 223b may be based on the font color of the text displayed in the subtitle display area w2 and the overlapping color range of the window w1. Specifically, the inverted color of the font color of the text displayed in the subtitle display area w2 may be used for the background color of the subtitle display area w2 set by the background setter 223b. Specifically, for example, in case that the font color of the text displayed in the subtitle display area w2 is white, black may be used for the background color of the subtitle display area w2. In case that the font color of the text displayed in the subtitle display area w2 is black, white may be used for the background color of the subtitle display area w2.

Next, if the font color of the text is similar to the color in the color range of the window w1 which the subtitle display area w2 overlaps, that is, similar to the color of the desktop background or the color contained in the displayed window w1, the background color of the subtitle display area w2 set by the background setter 223b may be displayed darker. If the font color is dissimilar to the color of the desktop background or the color contained in the displayed window w1, the background color of the subtitle display area w2 set by the background setter 223b may be displayed lighter. The light and dark of the background color of the subtitle display area w2 may be set by adjusting the so-called transparency. Specifically, the background of the area may be adjusted to be darker by reducing the transparency, or to be lighter by increasing the transparency. Colors being dissimilar means, for example, that the brightness and saturation of the colors are different beyond a specified threshold.

Also, the background color set by the background setter 223b may be set to a different color in accordance with the speaker's emotion recognized by the emotion recognizer 221c. Specifically, for example, the background color may be set to red if the speaker's emotion of anger is recognized, and set to blue if the speaker's emotion of sorrow is recognized. In addition, if the speaker's emotion can be classified in detail, the background color may be set in accordance with each classification.

The background color set by the background setter 223b may be changed in accordance with the speaker recognized by the speaker recognizer 221d. Specifically, in case of displaying a content spoken by a speaker, the content may be displayed in red. In case of displaying a content spoken by another speaker, the content may be displayed in blue. Also, a color may be assigned to each speaker, and the background color may be changed in accordance with the speaker.

The area setter 223c sets a position to display the subtitle display area w2.

The storage 230 comprises an output storage 231 and a setting storage 233 as functional components.

The output storage 231 stores the video, display, and text outputted from the outputter 240 in the memory 30S.

The setting storage 233 stores information necessary for the processor 220 to execute a process in the memory 30S. Initial values for the information necessary for the processor 220 to execute the process may be stored in advance. Information acquired from the information stored in each terminal 100 of the subtitle display processing system 1 may be stored in the memory 30S.

The outputter 240 displays the subtitle display area w2 set by the display setter 223, and the log window w5 on the display screen D of the display 21 of the terminal 100. The log window w5 is displayed in an area different from the subtitle display area w2.

Figure 10:
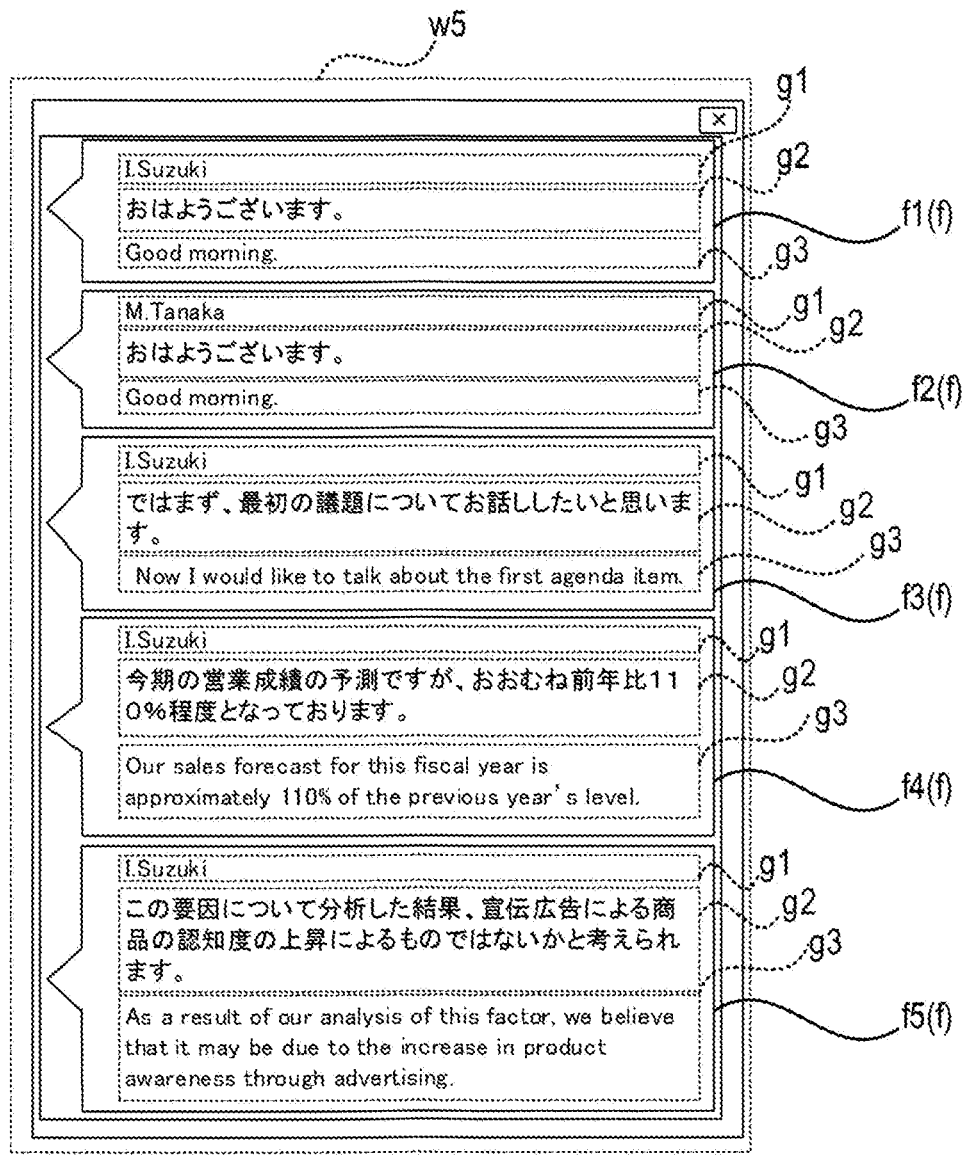
FIG. 10 A diagram showing an example of a log window.

FIG. 10 is a diagram showing an example of the log window w5. The log window w5 shown in FIG. 10 includes a voice-recognized content.

An example of the displayed log window w5 will be described with reference to FIG. 10. The displayed log window w5 is divided into blocks f and displayed corresponding to the display of the displayed subtitle display area w2. Each block f, for example, includes a speaker log g1, a voice recognition log g2, and a translation log g3 which respectively correspond to the contents displayed in the speaker display a1, the voice recognition display a2, and the translation display a3 of the subtitle display area w2.

The display mode of each block f included in the log window w5 is changed in accordance with the speaker's emotion when the voice of the content included in the block f is recognized. For example, the background color of each block f may be changed in accordance with the speaker's emotion. Also, the display modes of the texts included in the speaker log g1, the voice recognition log g2, and the translation log g3 may be changed in accordance with the speaker's emotion. Specifically, the background color, and the font type, size and color of the texts in the speaker log g1, the voice recognition log g2, and the translation log g3 may be changed in accordance with the speaker's emotion.

Figure 11:
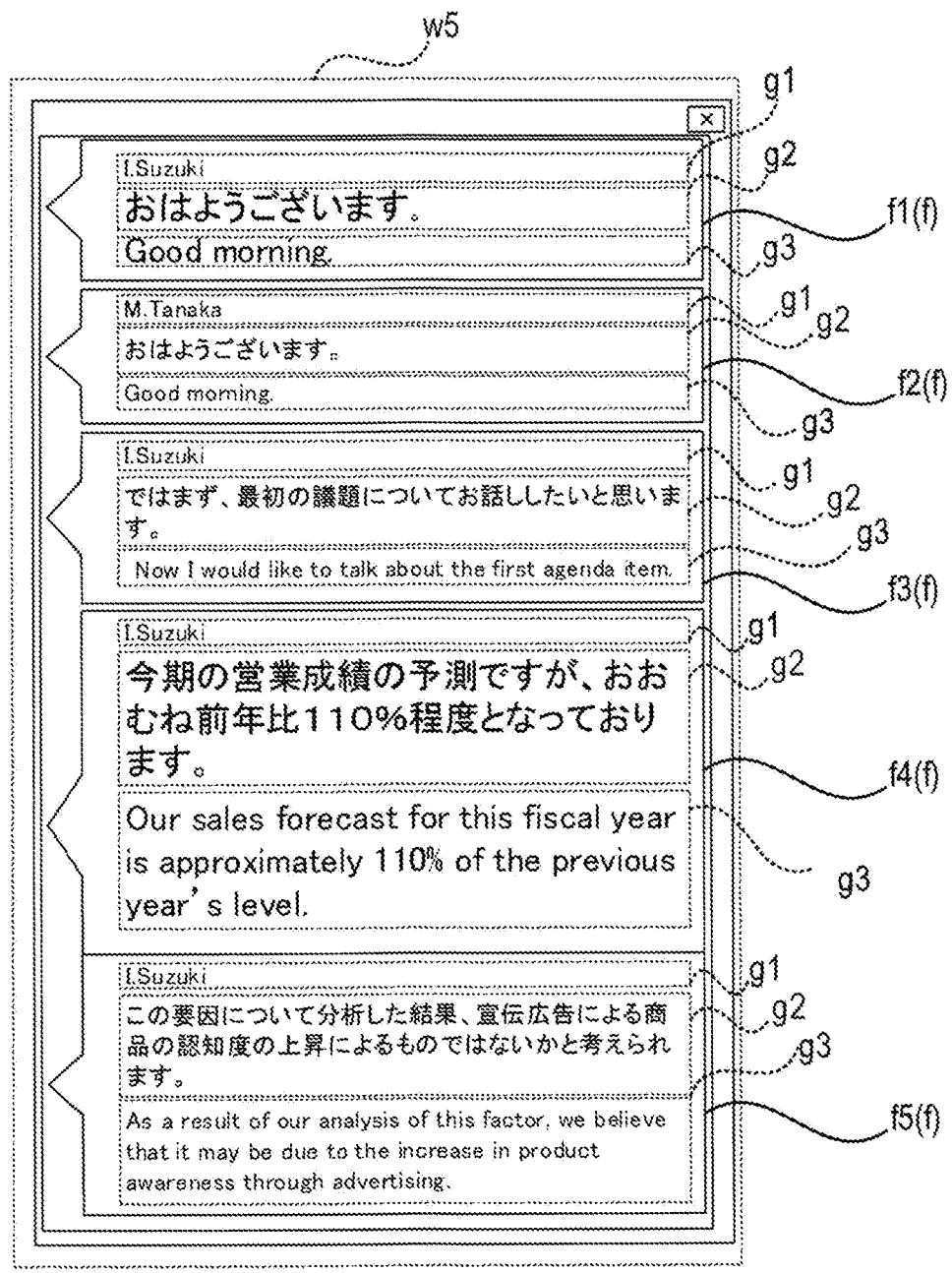
FIG. 11 A diagram showing an example of a change of a display mode in one example of the log window containing a voice-recognized content.

FIG. 11 shows an example in which the font size is changed in the display example of the log window w5 shown in FIG. 10. In FIG. 11, for example, when the speaker's emotion is "delight", the font size is increased. Change of the display mode is not limited to the case where the speaker's emotion is recognized as "delight", and may occur when the emotion is "anger", "sorrow" or "pleasure". The font size may be displayed in a different display mode in accordance with the recognized emotion.

The display mode to be changed is not limited to the font size, and may be the font type or color of the text. In the present embodiment, the display mode is changed for each area of the speaker log g1, the voice recognition log g2 and the translation log g3. However, each of the speaker log g1, the voice recognition log g2 and the translation log g3 may be partially changed. The part to be changed may be where the speaker's emotion is most recognized when the voice corresponding to the text displayed in the area is recognized. The magnitude of the recognized speaker's emotion is determined by a later-described emotion recognizer 221c.

Figure 12:
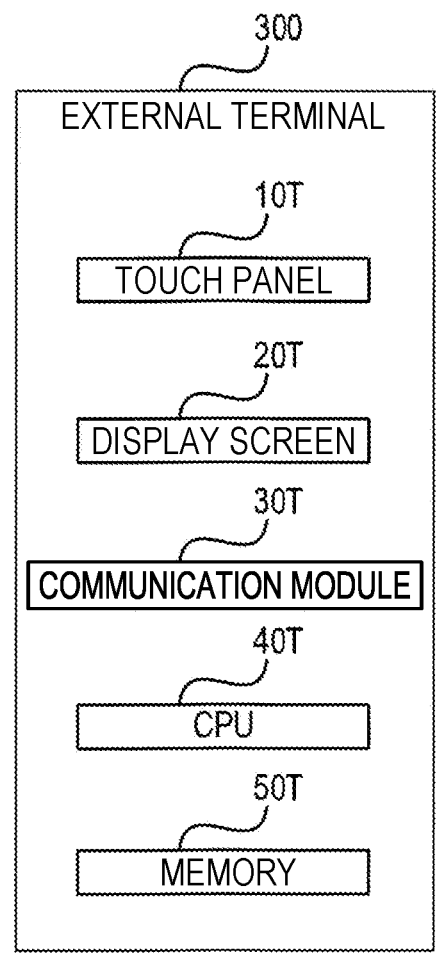
FIG. 12 A diagram showing an example of a hardware configuration of an external terminal.

Next, a hardware configuration of the external terminal 300 will be described with reference to the drawings. FIG. 12 is a diagram showing the hardware configuration of the external terminal 300 in the present embodiment.

The external terminal 300 comprises a touch screen 10T, a display screen 20T, a communication module 30T, a CPU 40T, and a memory 50T.

The touch screen 10T is an interface that enables input operation to the external terminal 300 by touch operation. Touch operation in the present embodiment includes various operations which enables inputs by the user's touch such as tap operation, flick operation and so on. Further, the input operation may include hover operation which is an operation of bringing a finger or the like close to the touch screen 10T. The touch screen 10T may be those used for general smartphones and tablet terminals.

As the display screen 20T, a screen such as a liquid crystal panel and an organic EL panel is used in the present embodiment. The organic EL herein is an abbreviation of organic Electro-Luminescence.

The communication module 30T is a module used to communicate with the terminal 100 and the server 200 of the subtitle display processing system 1. In the present embodiment, the external terminal 300 directly communicates with the server 200. The external terminal 300 is not limited to those which directly communicates with the server 200, and may be communicate with the server 200 via the terminal 100.

The CPU 40T executes various programs. In the present embodiment, the programs executed by the CPU 40T include a program stored in the memory 50T.

The memory 50T is a storage medium that stores various information including programs. In the present embodiment, the programs stored in the memory 50T include the program used to acquire the logs stored in the server 200.

The voice recognizer 221a and the translator 221b correspond to an example of a data outputter. The display setter 223 corresponds to an example of a display setter and a changer. The outputter 240 corresponds to an example of an indicator.

The display setter 223 corresponds to an example of a subtitle display mode changer, a balloon indicator, a balloon display mode changer and a button indicator.

The display acquirer 215 corresponds to an example of a background text acquirer and a background color acquirer.

[2. Operation]

<Display Process>

Next, a description will be given on a display process executed by the CPU 20S of the server 200. The display process herein means a process to control the display of the subtitle display area w2 in each of the terminals 100 included in the subtitle display processing system 1 when the terminals 100 communicate with each other to participate a so-called web conference. In the present embodiment, the first terminal 100a communicates with the second terminal 100b, and holds a web conference. Here, the CPU 20S controls the display of the screen of the first terminal 100a, and displays the same display on the screen of the second terminal 100b as that on the screen of the first terminal 100a.

In the present embodiment, the display process is executed in response to a request from the terminal 100 included in the subtitle display processing system 1.

The request from the terminal 100 to execute the display process may be made, for example, by executing a software such as an application stored in the terminal 100 in advance. In the present embodiment, the request to execute the display process is transmitted from the first terminal 100a included in the subtitle display processing system 1.

Figure 13:
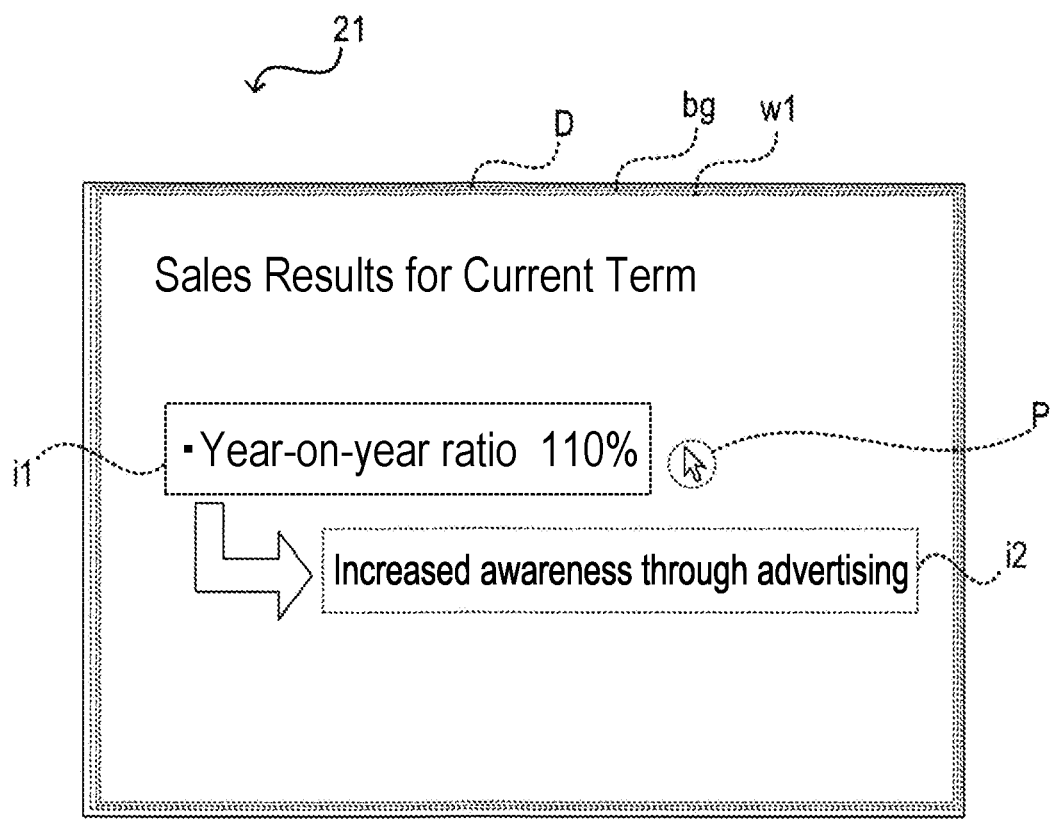
FIG. 13 A diagram showing an example of a display of a window displayed by execution of another application where a subtitle display area overlaps.

As an example of the display on the display screen D, a screen as shown in FIG. 13 is displayed. Specifically, as shown in FIG. 13, a text is displayed in an area i1 and an area i2 of the window w1.

Figure 14:
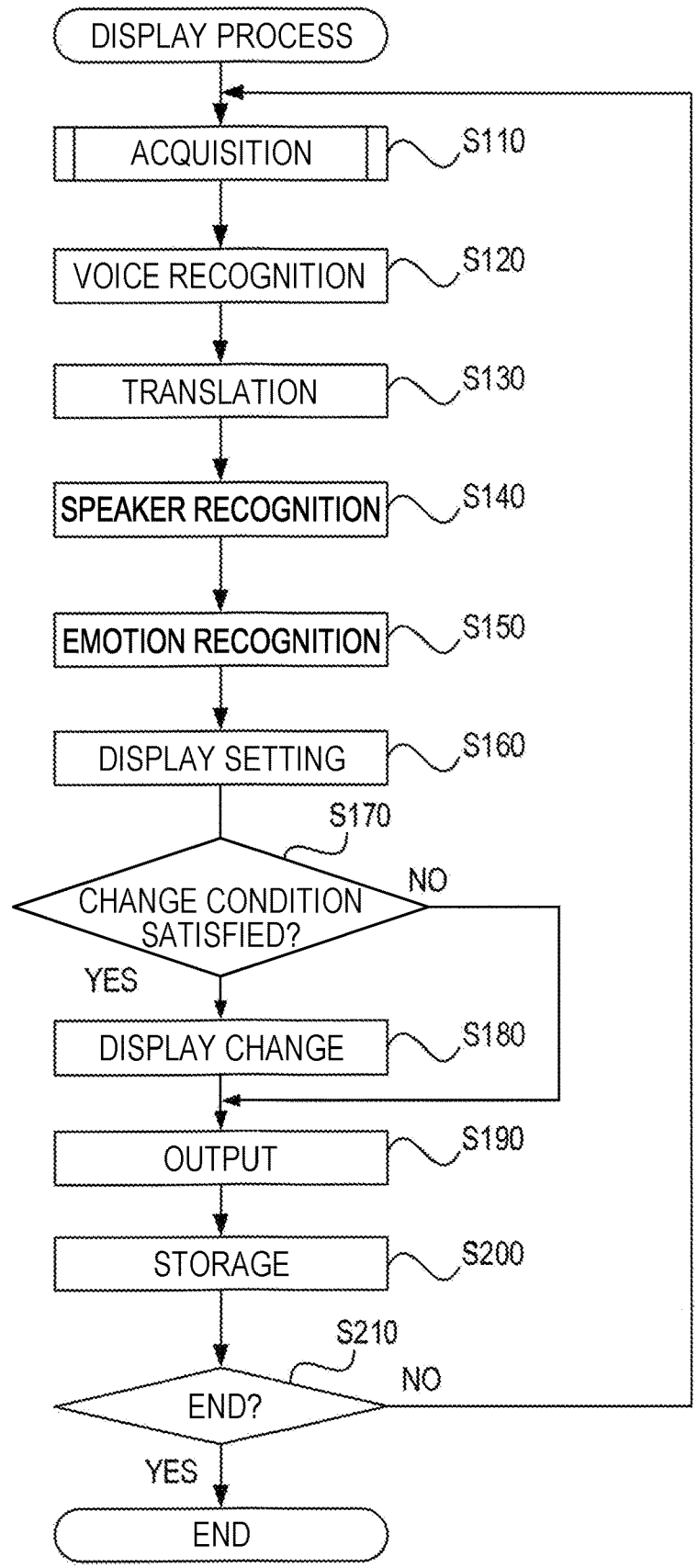
FIG. 14 A flowchart showing an example of a display process executed by a CPU of the server.

FIG. 14 is a flowchart showing the display process executed by the CPU 20S of the server 200.

As shown in FIG. 14, the CPU 20S executes an acquisition process in S110. The acquisition process herein is a process to acquire voice, display, operation and video data from the first terminal 100a and from the second terminal 100b. The first terminal 100a is the terminal 100 that has transmitted the request to execute the display process. The second terminal 100b holds a web conference with the first terminal 100a. The data from the first terminal 100a and the second terminal 100b is acquired by communication between the communication module 10S of the server 200, the communication module 30 of the first terminal 100a, and the communication module 30 of the second terminal 100b. Detail of the acquisition process will be described later.

In S120, the CPU 20S performs voice recognition of the voice acquired by the acquisition process executed in S110.

In S130, the CPU 20S translates the voice acquired in the acquisition process of S110 to a specific language. For example, a translation engine that uses artificial intelligence may be used for the translation.

In S140, the CPU 20S recognizes the speaker of the voice acquired in the acquisition process of S110.

In S150, the CPU 20S executes a process to recognize the speaker's emotion.

In S160, the CPU 20S performs display settings. The display settings herein mean setting the display on the first terminal 100a and the second terminal 100b based on the information acquired and recognized in S110 to S150.

The contents to be set include the position of the display area displayed on the display screen D of the display 21, in addition to the font size and color of the displayed text, the background color, and the transparency.

The position of the display area may be set by operating the display position setting icon.

In S170, the CPU 20S determines whether the display position set in S160 satisfies the change condition. The change condition is a condition indicating whether it is necessary to change the display position set by the display settings in S160. In the present embodiment, the change condition is determined based on the display position set in S160 and the position of the mouse pointer P displayed by the operation of the mouse 12. Specifically, if the subtitle display area w2 displayed in the position set in S160 and the display of the mouse pointer P overlap, it is determined that the change condition is satisfied. Otherwise it is determined that the change condition is not satisfied.

The specific description will be given with reference to FIGS. 15 and 16.

Figure 15:
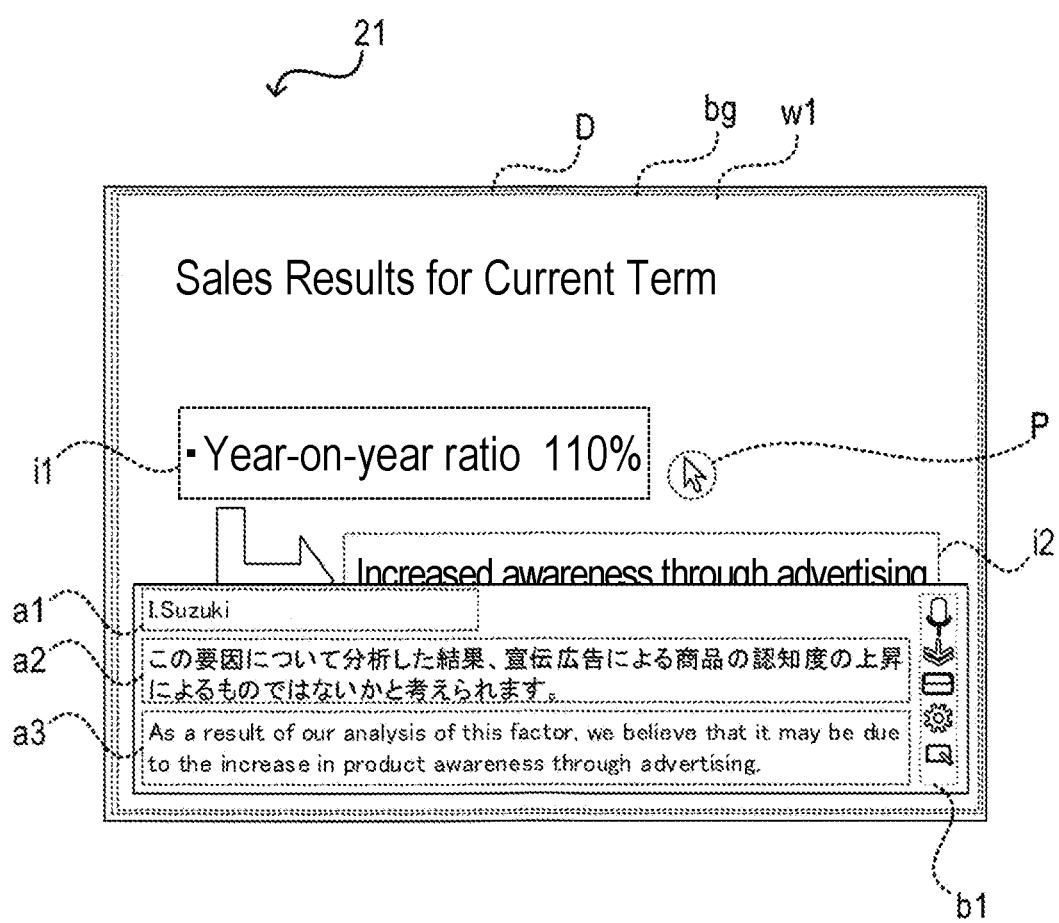
FIG. 15 A diagram showing an example of a display in which the subtitle display area overlaps a display of the window displayed by execution of another application.

As shown in FIG. 15, the position of the mouse pointer P does not overlap the subtitle display area w2. Therefore, the subtitle display area w2 is displayed in the position set in advance (for example, on the lower side of the display screen D).

Figure 16:
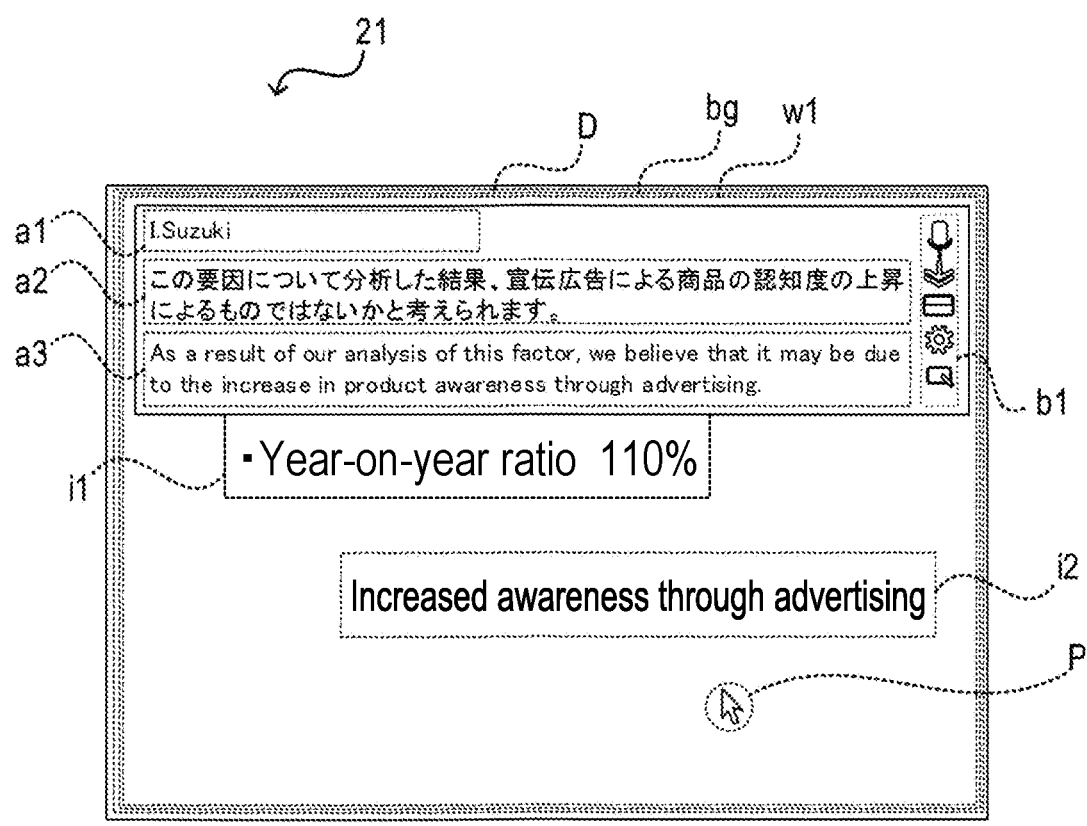
FIG. 16 A diagram showing an example of a display in which a position of the subtitle display area overlapping the display of the window displayed by execution of another application is changed.

On the other hand, if the mouse pointer P moves to a position where the mouse pointer P overlaps the subtitle display area w2, the position of the subtitle display area w2 is changed to a position on the upper side of the display screen D, as shown in FIG. 16. Specifically, the subtitle display area w2 is displayed in a position moved from the position displayed in FIG. 15 to a position where the subtitle display area w2 does not overlap the mouse pointer P.

The CPU 20S moves the process to S180 when determining in S170 that the change condition is satisfied.

In S180, the CPU 20S executes a process to change the position of the subtitle display area w2 set in S160. Specifically, the position of the subtitle display area w2 is changed so that the subtitle display area w2 is moved to a position where the subtitle display area w2 does not overlap the mouse pointer P. For the change of the position of the subtitle display area w2, for example, if the display position is set to the lower side of the display screen D in S160, the setting of the display position may be changed to the center of the display screen D. If the display position is set to the center in the up-down directions of the display screen D, the setting of the display position may be changed to the upper side of the display screen D. If the display position is set to the upper side of the display screen D, the setting of the display position may be changed to the lower side of the display screen D.

If the display position is set to the left side of the display screen D, the setting of the display position may be changed to the right side of the display screen D. Conversely, if the display position is set to the right side of the display screen D, the setting of the display position may be changed to the left side of the display screen D.

In S190, the CPU 20S displays the subtitle display area w2 based on the display mode set in S160. Also, if the setting is changed in S180, the CPU 20S displays the subtitle display area w2 based on the changed display mode. In the present embodiment, the display of the subtitle display area w2 is displayed on both the first terminal 100a and the second terminal 100b.

In S200, the CPU 20S executes a memory process to store the information displayed on the first terminal 100a and the second terminal 100b in S190. The CPU 20S also stores the setting information set in S160 in the memory process.

In S210, the CPU 20S determines whether the web conference has ended. Whether the web conference has ended may be determined, for example, by whether an operation of ending the web conference has been made by one of the first terminal 100a and the second terminal 100b.

The CPU 20S ends the display process when determining that the web conference has ended.

On the other hand, if it is determined that the web conference has not ended, the CPU 20S moves the process to S110, and executes the subsequent process.

S110 corresponds to an example of a process as the acquirer 210. S120 corresponds to an example of a process as the voice recognizer 221a. S130 corresponds to an example of a process as the translator 221b. S140 corresponds to an example of a process as the speaker recognizer 221d. S150 corresponds to an example of a process as the emotion recognizer 221c.

S160, S170 and S180 correspond to an example of a process as the display setter 223. S190 corresponds to an example of a process as the outputter 240. S200 corresponds to an example of a process as the storage 230.

<Acquisition Process>

Figure 17:
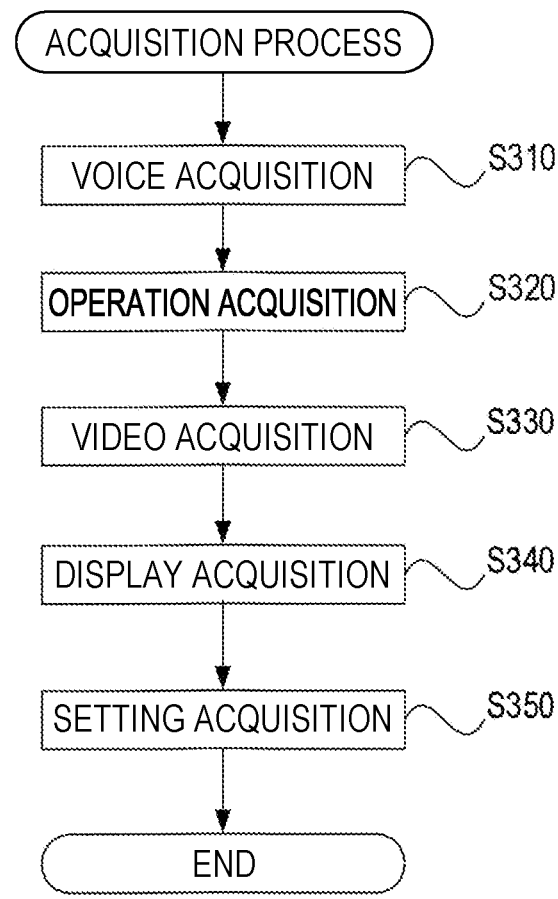
FIG. 17 A flowchart showing an example of an acquisition process executed by the CPU of the server.

Next, a description will be given on detail of the acquisition process executed in S110 of the display process by the CPU 20S with reference to FIG. 17.

In S310, the CPU 20S acquires voice data of the first terminal 100a and the second terminal 100b.

The voice data acquired here is the data inputted from the microphone modules 13 of the first terminal 100a and the second terminal 100b.

In S320, the CPU 20S acquires operation data of the first terminal 100a and the second terminal 100b.

The operation data acquired here is the data inputted from the keyboards 11 and mouses 12 of the first terminal 100a and the second terminal 100b.

The operation using the keyboard 11 herein includes an operation by typing using the keyboard 11. The operation using the mouse 12 includes various operations, that is, operation using buttons of the mouse 12 such as click, drag and drop, and scroll, and operation of moving the pointer using the mouse 12, and so on.

Further, the operation using the keyboard 11 and the mouse 12 includes information such as programs and functions executed by selecting the icons or the like displayed on each display 21.

In S330, the CPU 20S acquires video data of the first terminal 100a and the second terminal 100b.

The acquired video data are those captured by the camera modules 14 provided in the first terminal 100a and the second terminal 100b.

In S340, the CPU 20S acquires display data of the first terminal 100a and the second terminal 100b.

The acquired display data are the screen data displayed on the displays 21 provided in the first terminal 100a and the second terminal 100b. The display data include size data of the display 21, in addition to the image data displayed on the display 21. The size data of the display 21 may be, for example, the data included in EDID. EDID is an abbreviation of Extended Display Identification Data.

In S350, the CPU 20S acquires setting data of the first terminal 100a and the second terminal 100b, and ends the acquisition process.

The setting data acquired here may include data of language to translate to in S130 of the display process, data on the display mode of the display set in S160, and background data of the displayed area. The data of language to translate to may be, for example, data showing the destination language when performing the translation into a language different from the voice-recognized data. The data on the display mode may store the display modes of the font size, font type, font color of the voice-recognized text in S120 and the voice-recognized language translated in S130.

Further, the background color of the displayed area may be set as the background data of the displayed area. The background color of the displayed area may directly represent the displayed background color, and the difference between the color of the displayed area and the color of the image overlapping the area may be set to the background color of the displayed area.

The process in S310 corresponds to an example of a process as the voice acquirer 211. The process in S320 corresponds to an example of a process as the operation acquirer 213. The process in S330 corresponds to an example of a process as the video acquirer 217. The process in S340 corresponds to an example of a process as the display acquirer 215. The process in S350 corresponds to an example of a process as the setting acquirer 219.

<Log Transmission Process>

Figure 18:
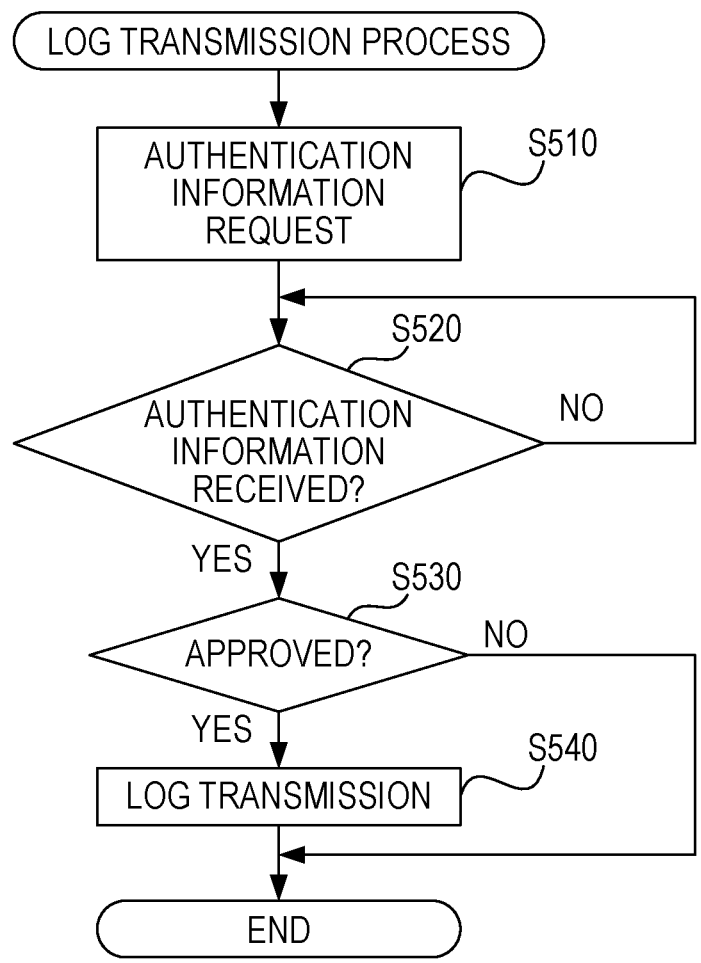
FIG. 18 A flowchart showing an example of a log transmission process executed by the CPU of the server.

Next, a description will be given on a log transmission process executed by the CPU 20S of the server 200 with reference to FIG. 18. The log transmission process is a process to transmit the result of voice recognition and the content displayed in the subtitle display area w2 as a result of translation in the held web conference, as a log.

In the present embodiment, the log transmission process is started when the server 200 receives a log transmission request signal via the communication network from the external terminal 300. The log transmission request signal is, for example, a signal received using the communication module 10S of the server 200.

In S510, the CPU 20S of the server 200 requests authentication information from the external terminal 300 which has made a log transmission request. Here, an ID and a password are requested as the authentication information. The ID and the password are set per log of web conferences, for example. The ID may be used to identify the log stored in the memory 30S of the server 200. The password is a text string required to acquire the log. Specifically, by inputting the password which is set per log located by the ID, authentication is approved, and information of the log is transmitted from the server 200. The terminal 10 which participates the web conference may be notified of the set ID and password via the communication network when the web conference ends.

In S520, the CPU 20S determines whether the authentication information requested in S510 is received from the external terminal 300.

The CPU 20S, when determining in S20 that the authentication information is not received, continues to wait for receipt of the authentication information.

On the other hand, the CPU 20S, when determining in S520 that the authentication information is received, moves the process to S530.

In S530, the CPU 20S determines whether to approve authentication based on the received authentication information. Specifically, the CPU 20S determines whether to approve authentication by determining whether the password corresponding to the ID of the log received from the external terminal 300 is correct. When the password corresponding to the ID of the log requested for transmission from the external terminal 300 matches the password received from the external terminal 300, the authentication is approved. If the password corresponding to the ID of the log requested for transmission from the external terminal 300 does not match the password received from the external terminal 300, the authentication is denied.

The CPU 20S, when determining in S530 to deny the authentication, ends the log transmission process. At this time, the external terminal 300 may be notified that the authentication has been denied.

On the other hand, the CPU 20S, when determining in S530 to approve the authentication, moves the process to S540.

In S540, the CPU 20S transmits the log to the external terminal 300, and ends the log transmission process.

In the present embodiment, the log transmission process corresponds to a process as the log transmitter 250.

[3. Effect]

(1) According to the above-described embodiment, the subtitle display area w2 is displayed in the position corresponding to each of the switch display buttons d1 to d5 included in the position setting window w3. Thus, when the speaker wants to change the position of the subtitle display area w2 while speaking in a web conference or the like, the burden of operations to be performed is reduced.

(2) Especially, in a web conference or the like, fluent explanation is often requested from the speaker, and fluency of explanation largely changes the speaker's impression on the other party of the web conference such as the audience. On the other hand, when the subtitle display area w2 which displays the voice-recognized text and the text translated from the voice-recognized text is displayed on the window w1 in an overlapping manner, explanation is difficult to understand, depending on the position of the subtitle display area w2 on the window w1.

According to the above-described embodiment, the positions of the subtitle display area w2 and the window w1 can be adjusted as required, and the burden of such adjustment operation is reduced. Thus, the speaker, while explaining, can easily move the subtitle display area w2 to an appropriate position.

(3) Also, in the above-described embodiment, since the subtitle display area w2 can be moved to the preset position, the load on the terminal 100 and the server 200 required to move the position of the subtitle display area w2 can be reduced.

[4. Other Embodiments]

Figure 19:
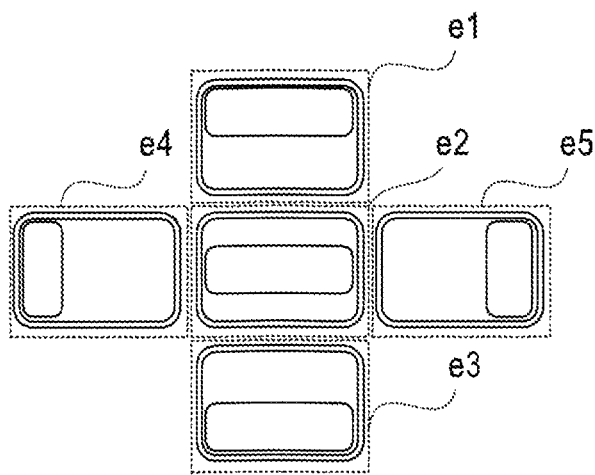
FIG. 19 A diagram showing an example of a display of a displayed position setting window in a variation.

(1) In the above-described embodiment, when setting the position of the subtitle display area w2, the position setting window w3 is displayed by clicking the position setting icon c3 included in the icon area b1. In the above-described embodiment, the switch display buttons d1 to d5 are displayed side by side in the up-down directions in the position setting window w3, as shown in FIG. 9. However, the way to display the buttons is not limited to the side-by-side arrangement in the up-down directions like the switch display buttons d1 to d5 shown in FIG. 9. For example, as shown in FIG. 19, switch display buttons e1 to e5 may be displayed instead of the switch display buttons d1 to d5. Relative arrangement of each of the switch display buttons e1 to e5 may correspond to the position to display the subtitle display area w2 on the display screen D. That is, the switch display button e2 to display the subtitle display area w2 in the center of the display screen D may be arranged in the center. Further, the switch display button e1 to display the subtitle display area w2 on the upper side of the display screen D may be arranged on the upper side of the switch display button e2. The switch display button e3 to display the subtitle display area w2 on the lower side of the display screen D may be arranged on the lower side of the switch display button e2. Also, the switch display button e4 to display the subtitle display area w2 on the left side of the display screen D may be arranged on the left side of the switch display button e2. The switch display button e5 to display the subtitle display area w2 on the right side of the display screen D may be arranged on the right side of the switch display button e2.

The configuration as above enables the user to intuitively set the position of the subtitle display area w2. Thus, it is easier for the speaker as the user of the terminal 100 to set the position of the subtitle display area w2 while speaking in a web conference or the like.

(2) Also, in the above-described embodiment, by clicking the button displayed in the position setting window w3, the subtitle display area w2 is set to the position corresponding to the clicked button. However, the position setting of the subtitle display area w2 is not limited to this way.

For example, the position of the subtitle display area w2 may be set so that the content represented by the text displayed in the subtitle display area w2 does not overlap the text displayed in the window w1 on which the subtitle display area w2 is displayed in an overlapping manner. Further, when acquiring the text displayed in the window w1 and displaying the same content as the acquired text in the subtitle display area w2, the subtitle display area w2 may be set to be displayed in a position other than the position where the text acquired is displayed in the window w1. The content of the text displayed in the window w1 is detected by way of an API of the OS which executes the software displaying the window w1, for example.

Figure 20:
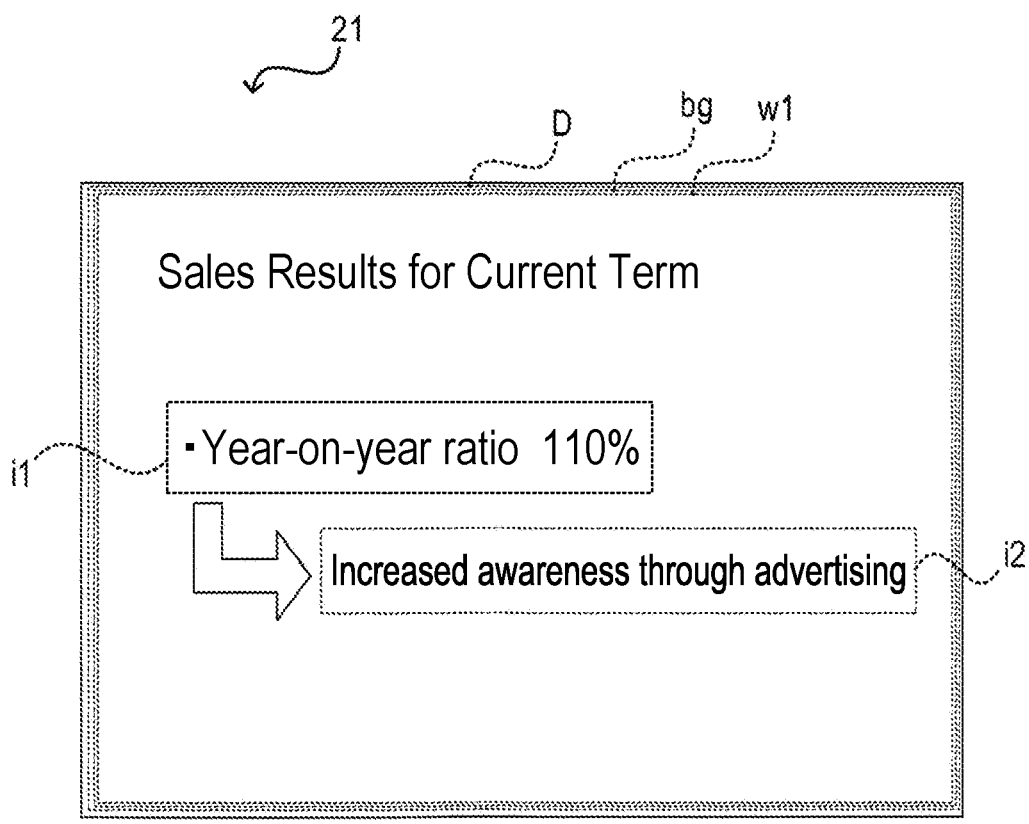
FIG. 20 A diagram showing an example of the display of the window displayed by execution of another application.
Figure 21:
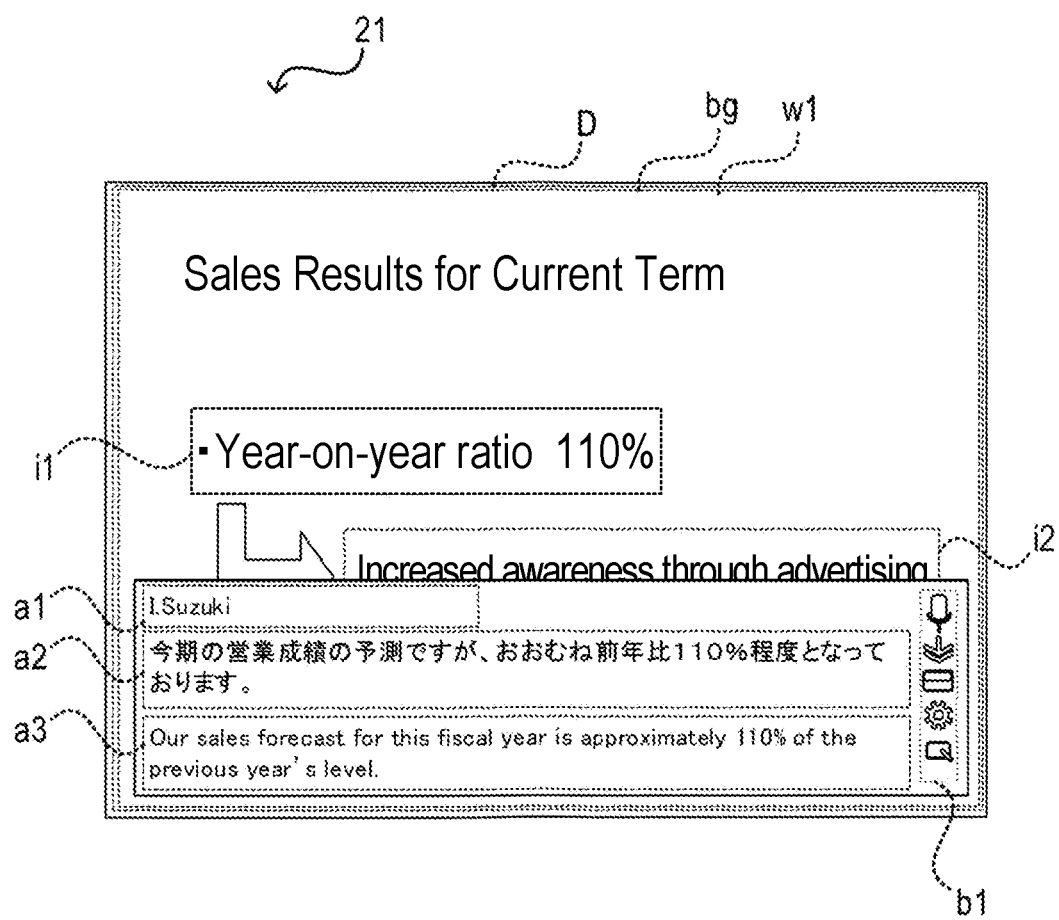
FIG. 21 A diagram showing an example of a display of the subtitle display area on the window.

A specific description will be given with reference to FIGS. 20, 21 and 22. FIG. 20 is a diagram showing an example of the display of the window displayed by execution of another application. In FIG. 20, the mouse pointer P is omitted.

In the areas i1 and i2 of the window w1, text strings of "Year-on-year ratio: 110%" and "Increased awareness through advertising" are displayed, respectively.

Here, one example of the display of the subtitle display area w2 on the window w1 will be described with reference to FIG. 21. Specifically, the subtitle display area w2 is displayed so as to be located on the lower side of the display screen D which is the set position.

Figure 22:
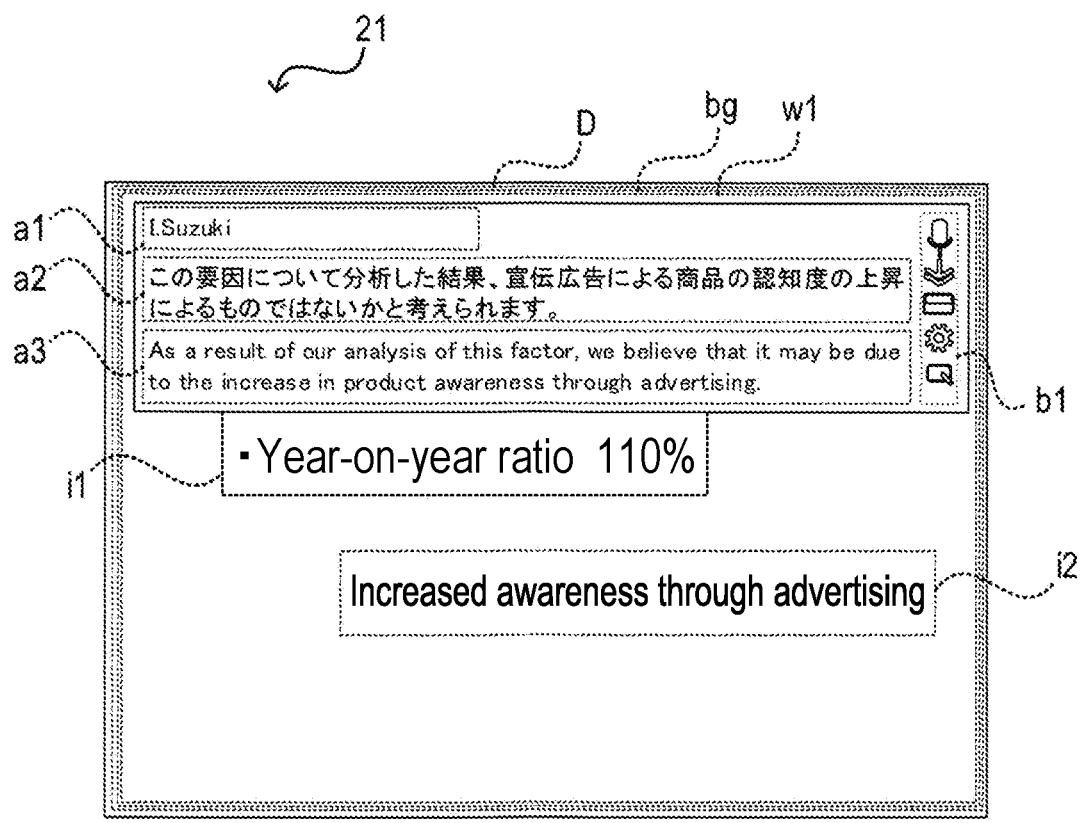
FIG. 22 A diagram showing an example in which a position of the display of the subtitle display area is changed in accordance with a change condition, and the subtitle display area is displayed on the upper side of the display screen.

Next, as shown in FIG. 22, a content "as a result of our analysis of this factor, we believe that it may be due to the increase in product awareness through advertising" is recognized by voice recognition. In this case, "through advertising" and "increase awareness" in the voice-recognized content match the text string displayed in the area i2 of the window w1. The subtitle display area w2, if displayed on the lower side of the display screen D, will be displayed in a position overlapping the position of i2. Thus, as shown in FIG. 22, the display position of the subtitle display area w2 is changed to the upper side of the display screen D.

Figure 23:
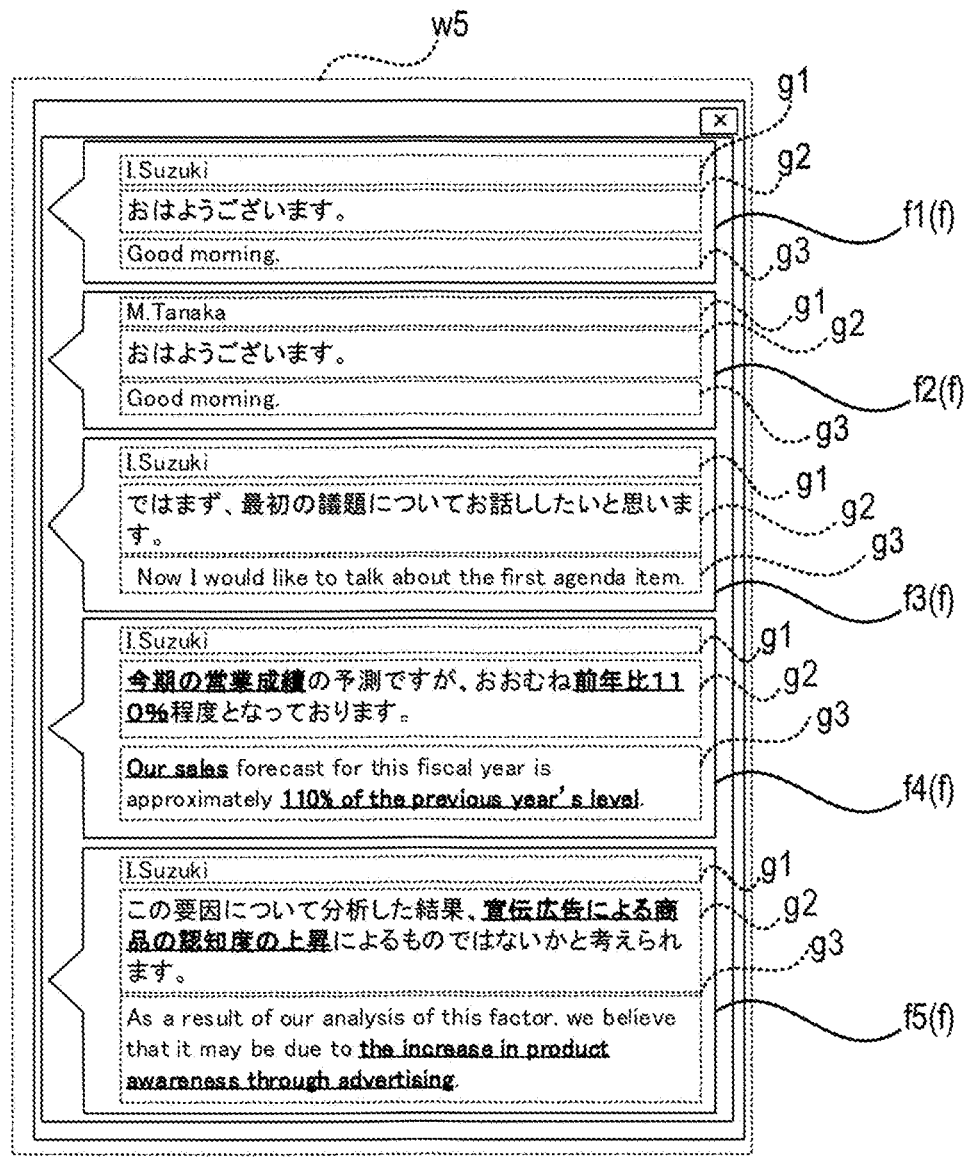
FIG. 23 A diagram showing an example of a change of the display mode in one example of the log window containing the voice-recognized content.

(3) Further, if the texts displayed in the subtitle display area w2 and the window w1 are recognized, the display position of the portion of the log window w5 that matches the text displayed in the window w1 may be changed, as shown in FIG. 23. Specifically, the format of the portion may be changed to be bold and underlined. The display mode after the change is not limited to bold and underline. The font size may be larger than the default size.

A description will be given on an example in which a tablet terminal is used as the external terminal 300, and the log window w5 is displayed on the display screen of the tablet terminal, with reference to FIG. 24.

Figure 24:
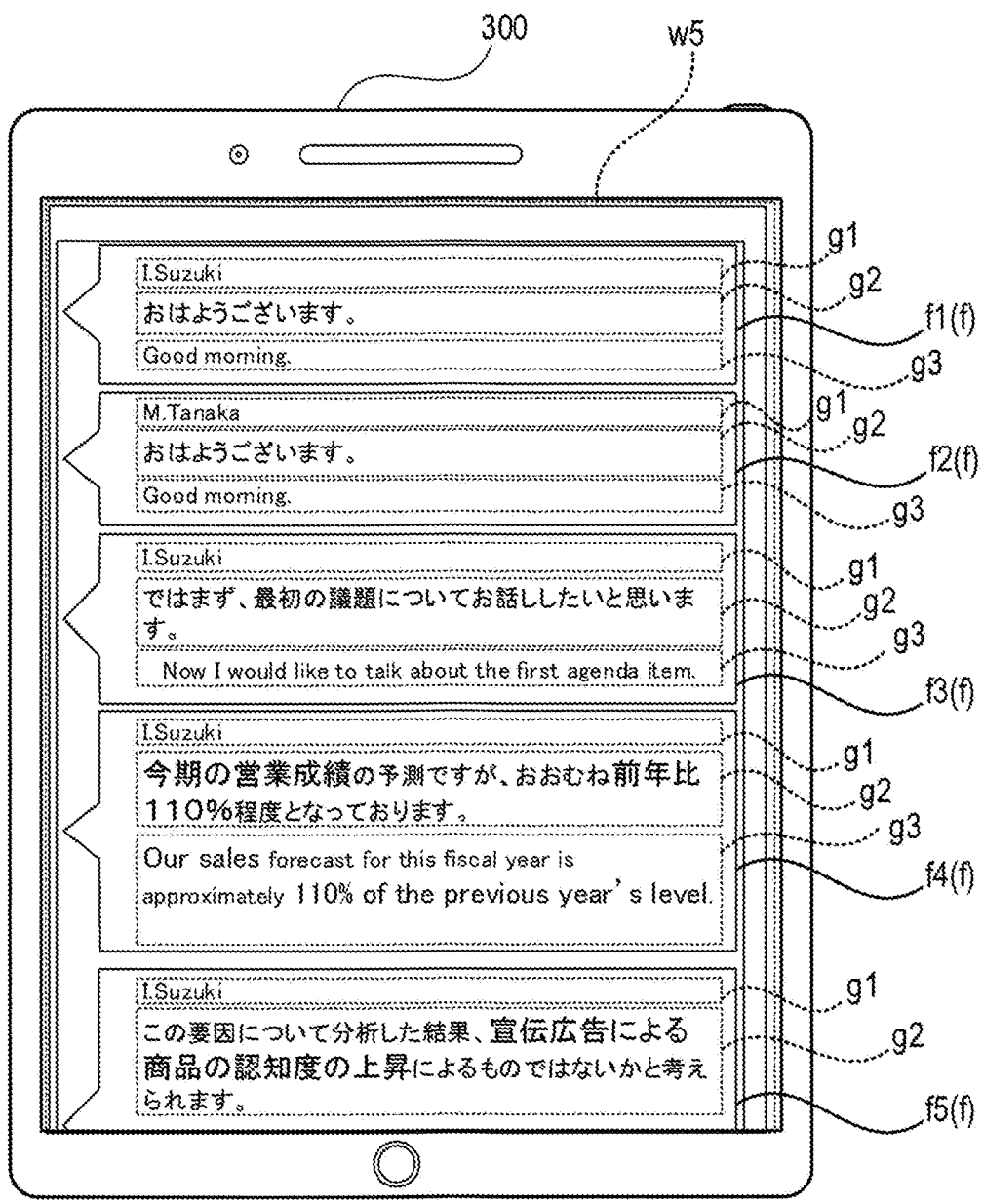
FIG. 24 A diagram showing an example of the display screen where the log window containing the voice-recognized content is displayed on a tablet.

As shown in FIG. 24, the log window w5 may be configured to be displayed in full-screen. The display of the log window w5 may be scrolled by flicking the touch screen 10T of the external terminal 300.

(4) In addition to the above-described embodiment, use of the mouse 12 may enable the user to increase or decrease the size of the displayed subtitle display area w2 and move the subtitle display area w2.

Figure 25:
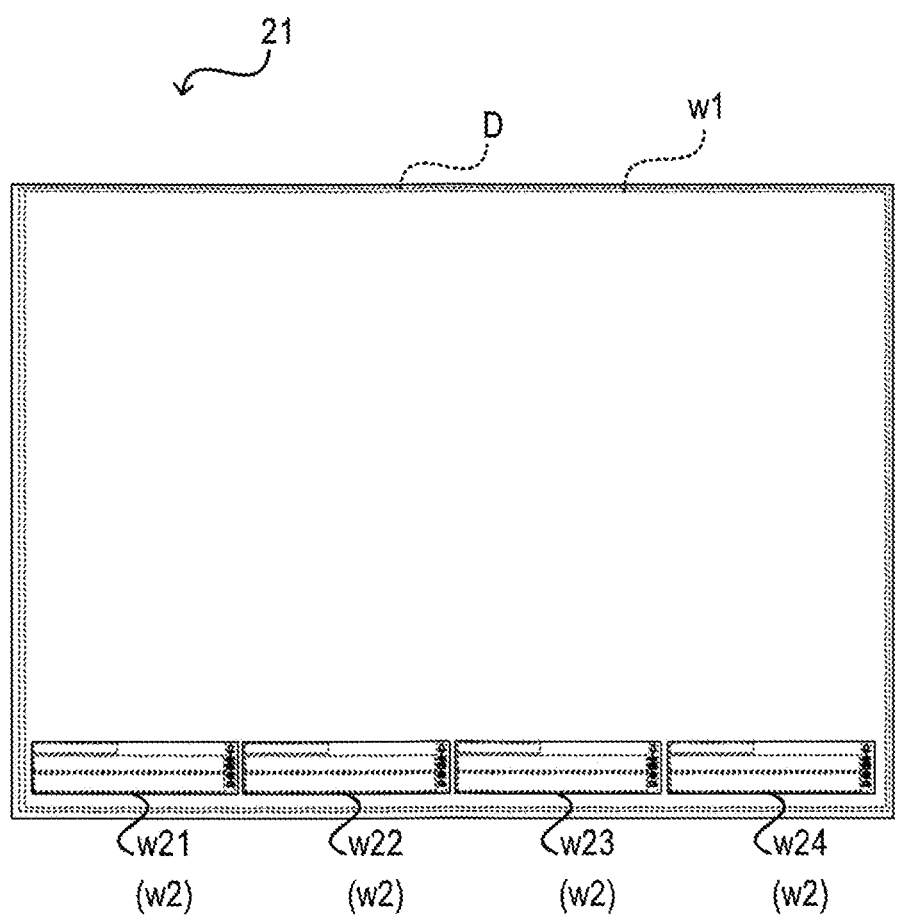
FIG. 25 A diagram showing an example of a screen set by the display setter and displayed in a variation.

(5) In the above-described embodiment, one subtitle display area w2 is displayed on the display screen D. However, the number of w2 displayed on the display screen D is not limited to one. For example, as shown in FIG. 25, two or more subtitle display areas w2 that are subtitle display areas w21, w22, w23 and w24 may be displayed. Also, the content displayed in each subtitle display area w2 may be displayed per corresponding speaker. That is, in case that there are two or more speakers, the subtitle display area w2 is not limited to the one that sequentially updates and displays the content. The subtitle display area w2 may be set per speaker. Specifically, the subtitle display area w21 may correspond to the first speaker, the subtitle display area w22 may correspond to the second speaker, the subtitle display area w23 may correspond to the third speaker, and the subtitle display area w24 may correspond to the fourth speaker. Also, when there is an increase in the number of speakers or an increase in the number of participants to a web conference, the subtitle display area w2 may be added and displayed.

The sizes of the two or more subtitle display area w2 may be the same or different. The size of each subtitle display area w2 may be different, for example, per job title. For example, the subtitle display area w2 for the speaker with a higher job title may be largely displayed.

(6) In the above-described embodiment, the voice recognition engine used for voice recognition and the translation engine used for translation can be selected from various types. This enables the user to use the voice recognition engine and the translation engine used by the user. That is, in voice recognition and translation, the voice data is acquired by the voice recognition engine and the translation engine. Thus, if the voice recognition engine and the translation engine are selectable, it is possible to permit the voice recognition engine and the translation engine to acquire voice data. In other words, it is possible to inhibit using the voice recognition engine and the translation engine provided by those to whom the transmission of the voice data is not desired.

(7) In addition, according to the content of the voice recognition, the voice recognition engine and the translation engine may be selected. For example, if the voice-recognized content contains the name of a competitor of a provider of a voice recognition engine and a translation engine, selection of the voice recognition engine and the translation engine may be inhibited. Also, each of the voice recognition engine and the translation engine has its own characteristics, such as an engine good at performing voice recognition and translation of everyday conversations, an engine good at performing voice recognition and translation of business conversations, and so on. Thus, an engine that suits each characteristic may be selected. Specifically, a voice recognition engine and a translation engine may be set in advance for each conversation type, and the voice recognition engine and the translation engine may be selected in accordance with the conversation type of the recognized voice.

(8) In the above-described embodiment, when the display positions of the mouse pointer P and the subtitle display area w2 overlap, the display position of the subtitle display area w2 is changed. However, the position of the subtitle display area w2 may not be necessarily changed when the positions of the mouse pointer P and the subtitle display area w2 overlap. For example, when a specified key of the keyboard 11 is depressed, the position of the subtitle display area w2 may not be changed even if the positions of the mouse pointer P and the subtitle display area w2 overlap. Such a configuration can inhibit the position of the subtitle display area w2 from being changed when the button in the icon area b1 of the subtitle display area w2 is clicked using the mouse 12.

(9) Also, the change condition is not limited to overlapping of the display positions of the mouse pointer P and the subtitle display area w2. Specifically, the position of the subtitle display area w2 may be changed by clicking the position setting icon c3 in the icon area b1 and operating the switch display buttons d1 to d5.

(10) In the above-described embodiment, the speaker's facial expression of the terminal 100 is recognized using the camera module 14 of the terminal 100. However, the target to be recognized using the camera module 14 is not limited to the speaker's facial expression of the terminal 100. Specifically, the speaker's movement or gesture may be recognized. Also, the display mode of the subtitle display area w2 may be changed in accordance with the speaker's gesture.

(11) The terminal 100 may further include a motion sensor as the input interface 10. The motion sensor herein acquires information on the movement of the user such as the speaker. The motion sensor may include a distance image sensor, a video camera module, and an array microphone as components.

The distance image sensor is also referred to as a depth sensor. The distance image sensor may be a TOF sensor that measures a distance by emitting an infrared laser and measuring a time from when the infrared laser is emitted to when the reflected light is received. When the distance image sensor is a TOF sensor, a module using a monocular camera may be used. TOF herein is an abbreviation of Time of Flight.

The distance image sensor is not limited to a TOF sensor, and may be a sensor, for example, which emits a specific pattern with an infrared laser, and analyzes the pattern of the reflected light to measure a distance. The distance image sensor, for example, emits a light with uniform pattern dots, and receives the reflected light. The pattern dots included in the received reflected light are distorted depending on the distance to the target. Thus, the distance may be measured by analyzing the distortion included in the pattern dots of the reflected light.

A stereo camera that captures an image taken from two different positions may be used as the distance image sensor.

In the image acquired by the distance image sensor, the user's movement and gesture may be acquired based on posture recognition of the user such as a speaker. The posture recognition herein is a technique to recognize human body parts such as arms and head from the acquired image and derive positions of joints, thereby to estimate the human posture. The posture recognition may also use machine learning.

In the motion sensor, video recognized by the video camera module and information of voice recognition acquired by the array microphone may be used in recognizing the user's movement.

The motion sensor is not limited to those having the above-described configuration. A device used as a motion capture device may be used.

Further, the motion sensor may be provided in place of the camera module 14.

(12) In accordance with the gesture recognized by the camera module 14 of the terminal 100, a control corresponding to the gesture may be performed.

Specifically, a control may be performed such that, for example, when the speaker make a gesture of putting the index finger on the mouth, the terminal 100 of the speaker is controlled to be muted.

(13) In the above-described embodiment, the display mode of the text and the display mode of the background are changed. However, the present disclosure is not limited to those which change the display mode. For example, a symbol or an icon such as an exclamation mark ("!") may be added. Addition of the symbol or icon may be performed in accordance with the recognized speaker's emotion.

If such a symbol or icon is displayed in a text, it would be easy for a user, for example, who cannot recognize the voice such as a person with hearing difficulties, to recognize the speaker's emotion.

(14) The above-described embodiment describes the case where the speaker's emotion is determined based on the volume of the voice acquired by the microphone module 13 and the speaker's facial expression acquired by the camera module 14. However, emotion recognition is not limited to those acquired in these manners, and may be determined from words contained in the conversation or a flow of the story, for example. Relevance between words and emotions may be determined using artificial intelligence. The flow of the story may be also determined based on artificial intelligence.

(15) In the above-described embodiment, the speaker's remarks are recognized in the subtitle display area w2. However, remarks of only a specific speaker may be recognized. Also, only a specific language may be recognized.

(16) Further, in the above-described embodiment, the voice recognizer 221a uses a voice recognition engine and the translator 221b uses a translation engine to perform voice recognition and translation, respectively. However, the voice recognition engine and the translation engine to perform voice recognition and translation are not limited to one each. For example, two or more voice recognition engines and translation engines may perform voice recognition and translation. In such cases, for example, the voice-recognized content by the voice recognition engine and the translated content by the translation engine may be displayed side by side, in the voice recognition display a2 and the translation display a3 displayed in the subtitle display area w2.

(17) Also, the above-described embodiment describes the case where the content of the log window w5 is transmitted to the external terminal 300 as a log. However, what is transmitted to the external terminal 300 is not limited to the content of the log window w5. Only the text or the translation of a specific language in the log window w5 may be transmitted to the external terminal 300.

Figure 26:
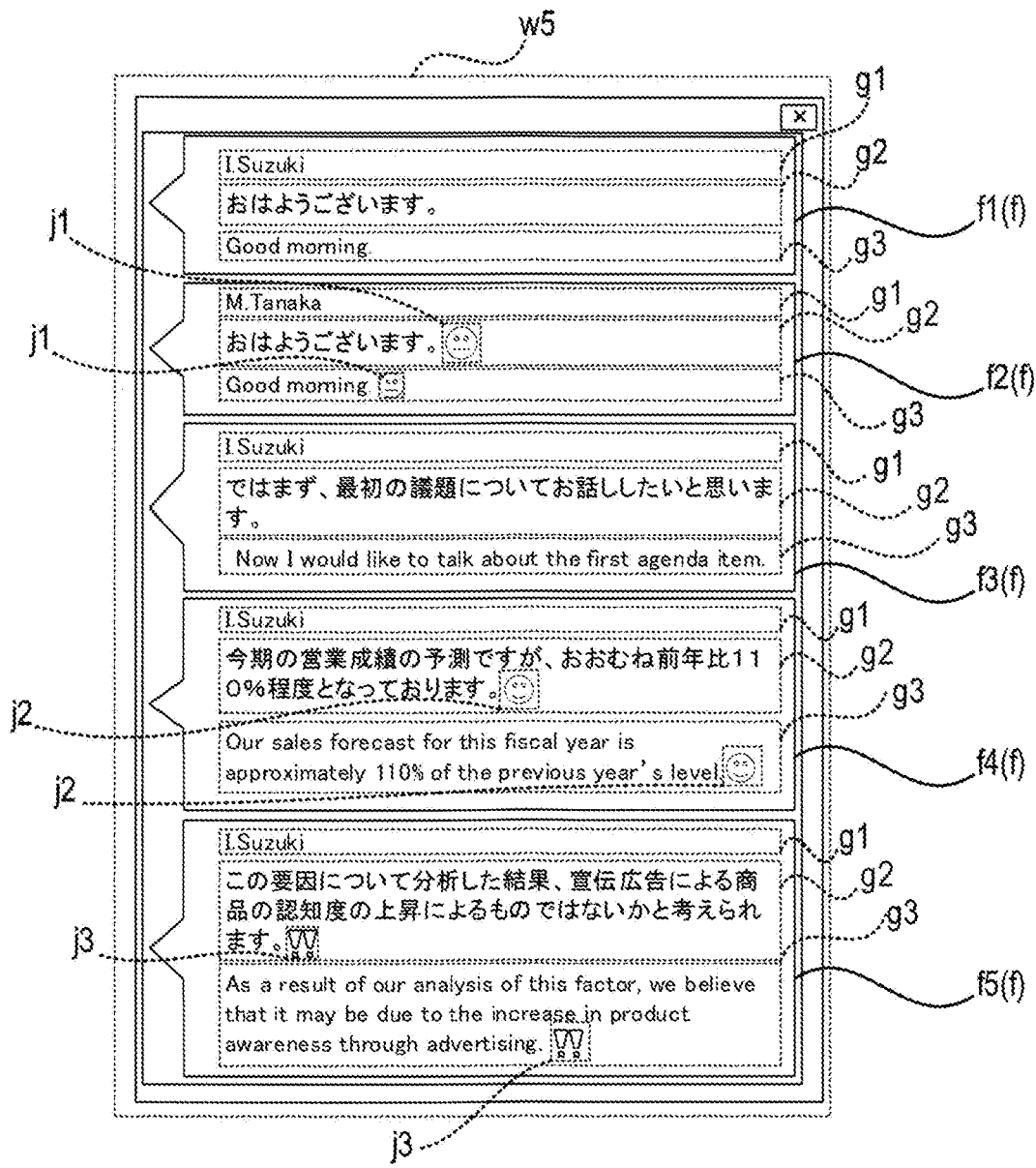
FIG. 26 A diagram showing an example of the log window with icons.

(18) In the above-described embodiment, the application software of the user who is participating the web conference may be configured to add a reaction or evaluation such as "like!" and "heart" to each of the blocks f contained in the log window w5. The application software may be configured such that a reaction or evaluation may be added by the user selecting the block f to which the user intends to add a reaction or evaluation and clicking the icon corresponding to the reaction or evaluation. FIG. 26 shows an example of the log window w5 to which the evaluation is added. As shown in FIG. 26, icons such as emoji j1, j2 and j3 may be used to add the reaction or evaluation.

(19) How to add a reaction or evaluation may not be limited to click operation. For example, such addition may be performed by recognizing the user's facial expression or gesture using the camera module 14. Specifically, when the user's facial expression is a smile, a positive expression or evaluation such as "like" and "heart" may be added. When the user's facial expression is a sad face or angry face, a negative reaction or evaluation may be added. As a gesture, when an OK sign is given by fingers or when nodding is made, a positive reaction or evaluation may be added. When a cross sign is given by fingers or the hand is waved in the left-right directions, a negative reaction or evaluation may be added.

The display modes of the backgrounds of the subtitle display area w2 and the log window w5 and the texts contained therein may be changed by the aforementioned user's facial expression or gesture.

(20) The block f added with a reaction may be extracted and stored. With the configuration as above, the block f added with a reaction can be stored collectively as important blocks f.

(21) A configuration which counts the number of added reactions may be provided. The counting may be executed by the server 200. With the configuration as such, the block f with particularly high reactions can be extracted. The format of the extracted block f may be arranged so as to be used as minutes.

(22) In the above-described embodiment, the display of the subtitle display area w2 may be set using AI. The setting using AI is not limited to those based on the information acquired by the acquirer 210, and may be based on the acquired various information.

Figure 27:
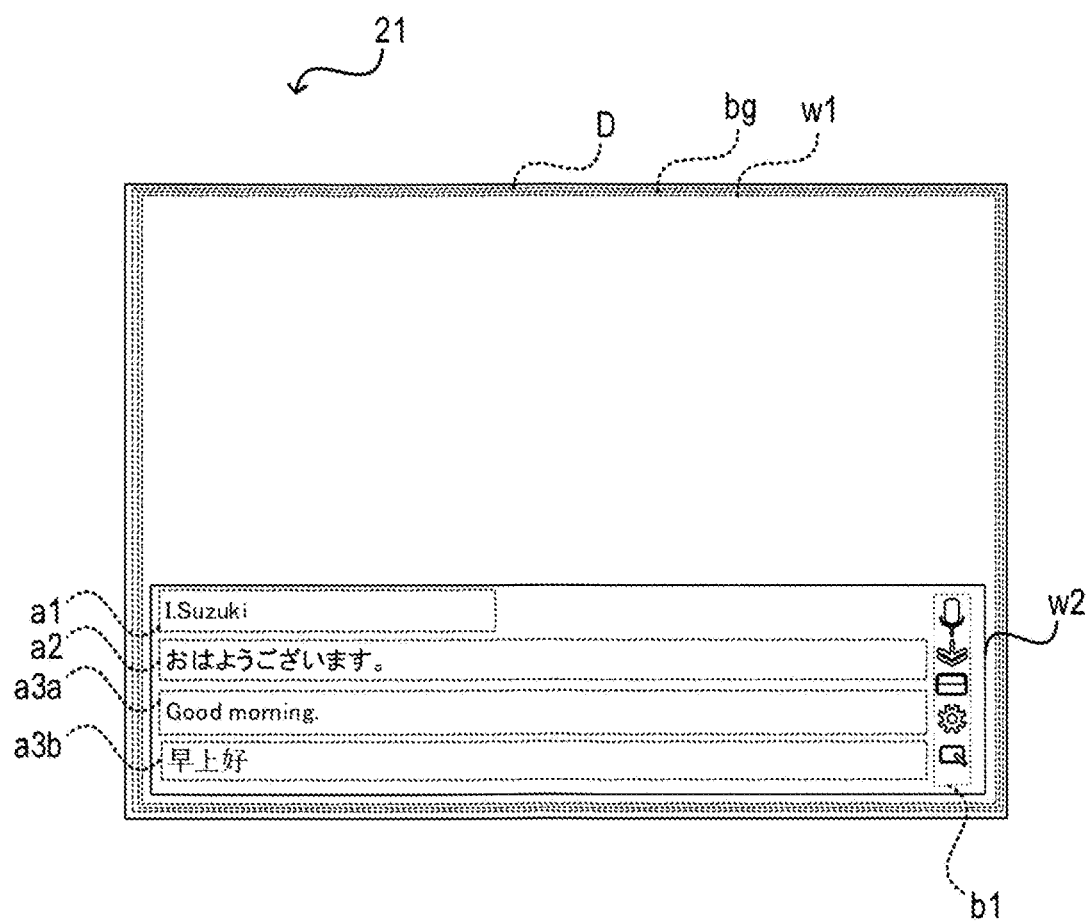
FIG. 27 A diagram showing an example of a display of the screen on which a display screen containing the voice-recognized content is displayed in a variation.

(23) In the above-described embodiment, one language is displayed on the translation display a3 displayed in the subtitle display area w2. However, the number of languages displayed on the translation display a3 is not limited to one. Specifically, the translation may be made into two or more languages. FIG. 27 shows an example of the translation into two or more languages, that is, an example in which there are two or more translation displays.

Figure 28:
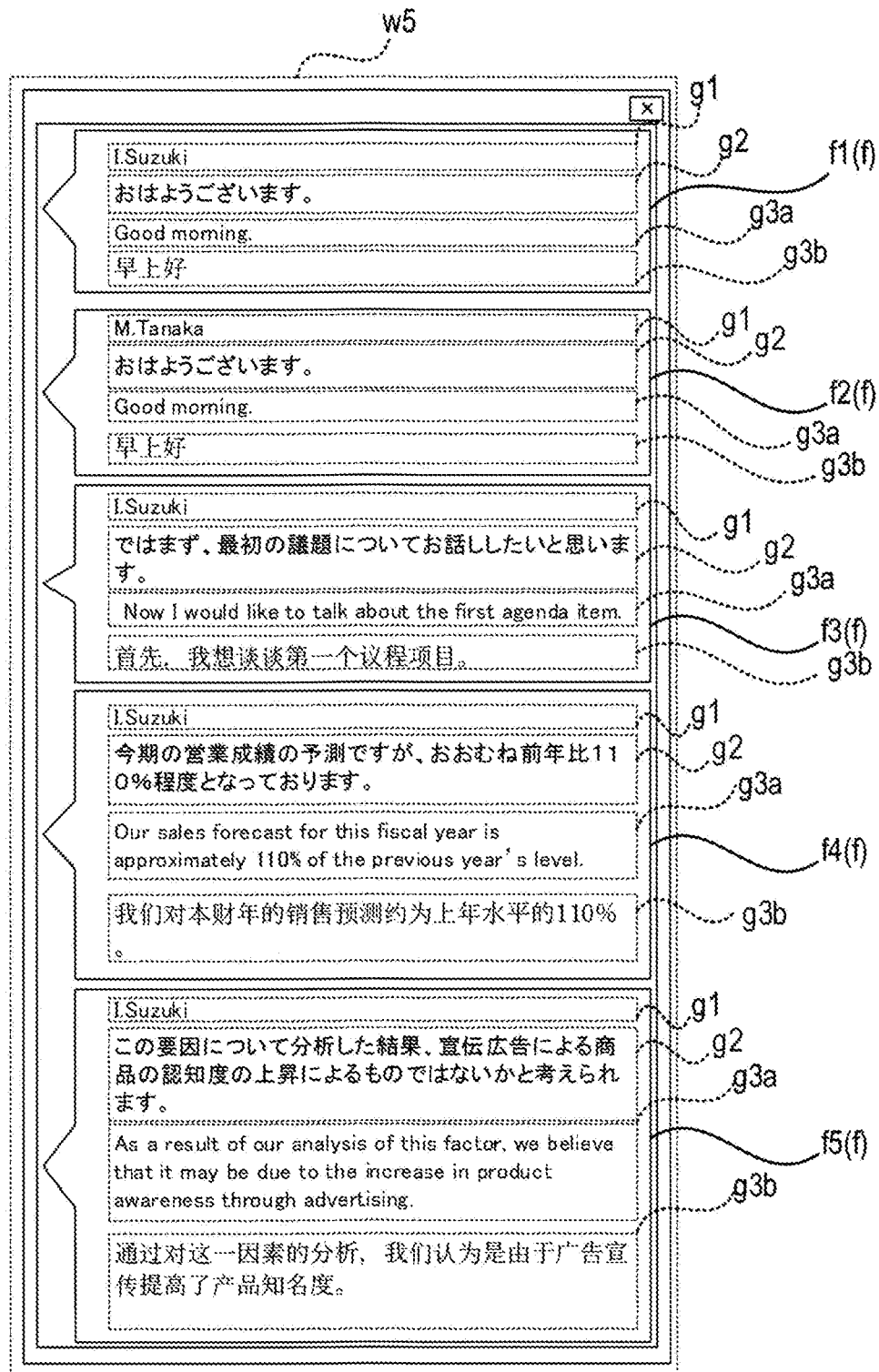
FIG. 28 A diagram showing an example of the log window containing the voice-recognized content in a variation.

As shown in FIG. 27, a translation display a3a and a translation display a3b may be displayed. In FIG. 27, the translation display a3a shows a text translated into English, and the translation display a3b shows a text translated into Chinese. The destination languages set to be displayed on the translation display a3a and the translation display a3b may be set in advance by the display setter 223. Or, the destination language may be set by selecting the translation language button h2 displayed on the setting display w4. In this case, the translation language button h2 may be displayed in such a manner that multiple number of languages are selectable. When the translation is made into two or more languages, the log window w5 representing the translation into two or more languages may be generated, as shown in FIG. 28.

(24) The CPU 20S and the method of the present disclosure may be implemented by a dedicated computer comprising: a processor programmed to execute one or more functions embodied by a computer program; and a memory. Alternatively, the CPU 20S and the method of the present disclosure may be implemented by a dedicated computer comprising a processor including one or more dedicated hardware logic circuits. Or, the CPU 20S and the method of the present disclosure may be implemented by one or more dedicated computers comprising: a processor programmed to execute one or more functions; and a memory, in combination with one or more hardware logic circuits. The computer program may be stored in a computer readable non-transitory tangible storage medium as instructions executed by the computer. Software may not be necessarily included in the method for implementing the functions of the respective portions included in the CPU 20S. All the functions may be implemented by one or more hardwares.

(25) Two or more functions of one element in the aforementioned embodiments may be achieved by two or more elements; or one function of one element in the aforementioned embodiments may be achieved by two or more elements. Likewise, two or more functions of two or more elements may be achieved by one element; or one function achieved by two or more elements may be achieved by one element. A part of the configuration of the aforementioned embodiments may be omitted; and at least a part of the configuration of the aforementioned embodiments may be added to or replaced with another part of the configuration of the aforementioned embodiments.

(26) The present disclosure can be also implemented in various modes, such as a system including the CPU 20S as an element, a program to cause a computer to function as the CPU 20S, a non-transitory tangible storage medium such as a semiconductor memory storing this program, a subtitle display process method and so on, in addition to the above-described CPU 20S.

(26) Specifically, the display process may not be limited to be executed by the CPU 20S of the server 200, and may be executed by the terminal 100. Among the two or more terminals 100, the display of the subtitle display area w2 on the display screen D of the second terminal 100b may be changed, together with the display of the subtitle display area w2 on the display screen ID of the first terminal 100a. The display process may be executed so-called standalone, and not via a network.

The terminal 100 in the present embodiment corresponds to an example of a configuration as a subtitle display processing device.

What is claimed is:

1. A non-transitory tangible storage medium configured to store software that when executed causes a computer to perform functions comprising:
a data outputter that outputs text data by at least one of a voice recognition function and a translation function, the voice recognition function outputting voice data as text data, the translation function translating the voice-recognized text data and outputting translated text data;
a display setter that sets a display position and a display size of a text display area on a display screen, the text display area being an area to display the text data outputted from the data outputter;
an indicator that displays the text data outputted from the data outputter in the text display area;
a changer that changes at least one of the display position and the display size of the text display area set by the display setter such that the text display area is situated in an area that does not overlap with the mouse pointer displayed on the display screen;
a downloader that downloads a content displayed in the text display area, and
a brightness adjuster that reduces a font size of text so that a specified number of letters are displayed on the text display area when the number of letters to be displayed in the text display area exceeds the specified number of letters, and adjusts brightness of color of the text and color of background of the text display area by adjusting the color of the text and the color of the background of the text display area.

2. The non-transitory tangible storage medium according to claim 1, the functions further comprising:

a subtitle display mode changer that changes at least one of a display mode of the text display area and a display mode of the text data displayed in the text display area, based on a speaker's facial expression acquired by a specific image capturer.

3. The non-transitory tangible storage medium according to claim 1, the functions further comprising:
   a balloon indicator that displays a balloon display area, the balloon display area being displayed in an area different from the text display area, and the balloon display area being a preset area further divided in accordance with a preset rule; and
   a balloon display mode changer that changes at least one of the display mode of the balloon display area and the display mode of the text data displayed in the balloon display area, wherein
   the balloon display mode changer functions to change the display mode of the balloon display area and the display mode of the text data displayed in the balloon display area, based on a speaker's facial expression acquired by a specific image capturer.

4. The non-transitory tangible storage medium according to claim 1, the functions further comprising:
   a button indicator that displays a switch display button associated with the display position and the display size on the display screen, wherein
   the changer functions to change the position and the size of the text display area to the display position and the display size associated with the selected switch display button.

5. The non-transitory tangible storage medium according to claim 1, the functions further comprising:
   a background text acquirer that acquires background text data that includes a text contained in background data displayed on the display screen and data of the display position of the text, wherein
   the changer functions to change at least one of the display position and the display size of the text display area so that the text display area is displayed in an area different from the area where the background text data matching a content of the text data before displayed in the text display area is displayed.

6. The non-transitory tangible storage medium according to claim 1, the functions further comprising:
   a background color acquirer that acquires a background color of a position where the text display area overlaps; and
   a display mode changer that changes transparency of the text display area in accordance with the background color acquired by the background color acquirer.

7. The non-transitory tangible storage medium according to claim 1, the functions further comprising:
   causing the data outputter to include both the voice recognition function and the translation function;
   causing the display setter to set a first area where text data outputted by the voice recognition function are displayed and a second area where text data outputted by the translation function are displayed;
   causing the computer to operate as a translation switcher operable to switch between execution and suspension of translation by the translation function; and
   causing the display setter to enlarge display of the first area when execution of translation is ended by a function of the translation switcher.

8. The non-transitory tangible storage medium according to claim 7, the functions further comprising causing the data outputter to directly translate voice-recognized data and output a result of translation.

9. A subtitle display processing device comprising:
   a data outputter configured to output text data by at least one of a voice recognition function and a translation function, the voice recognition function outputting voice data as text data, the translation function translating the voice-recognized data and outputting translated text data;
   a display setter configured to set a display position and a display size of a text display area on a display screen, the text display area being an area to display the text data outputted from the data outputter;
   an indicator configured to display the text data outputted from the data outputter in the text display area;
   a changer configured to change at least one of the display position and the display size of the text display area set by the display setter such that the text display area is situated in an area that does not overlap with a mouse pointer displayed on the display screen;
   a downloader configured to download a content displayed in the text display area; and
   a brightness adjuster that reduces a font size of text so that a specified number of letters are displayed on the text display area when the number of letters to be displayed in the text display area exceeds the specified number of letters, and adjusts brightness of color of the text and color of background of the text display area by adjusting the color of the text and the color of the background of the text display area.

10. The subtitle display processing device according to claim 9, wherein
    the indicator displays the text data in the text display area on the display screen provided to the subtitle display processing device and another device that communicates with the subtitle display processing device.

11. A server connected to at least one terminal in a communicable manner, the server comprising:
    a data outputter configured to output text data by at least one of a voice recognition function and a translation function, the voice recognition function outputting voice data as text data, the translation function translating the voice-recognized data and outputting translated text data;
    a display setter configured to set a display position and a display size of a text display area on a display screen provided to the at least one terminal, the text display area being an area to display the text data outputted from the data outputter;
    an indicator configured to display the text data outputted from the data outputter in the text display area;
    a changer configured to change at least one of the display position and the display size of the text display area set by the display setter such that the text display area is situated in an area that does not overlap with a mouse pointer displayed on the display screen;
    a downloader configured to download a content displayed in the text display area; and
    a brightness adjuster that reduces a font size of text so that a specified number of letters are displayed on the text display area when the number of letters to be displayed in the text display area exceeds the specified number of letters, and adjusts brightness of color of the text and color of background of the text display area by adjusting the color of the text and the color of the background of the text display area.

12. The server according to claim 11 further comprising:
a log transmitter that transmits a log to a specific external terminal, the log representing a content displayed by the indicator.

* * * * *

UNITED STATES PATENT AND TRADEMARK OFFICE
CERTIFICATE OF CORRECTION

| | | |
|---|---|---|
| PATENT NO. | : 12,147,723 B2 | Page 1 of 1 |
| APPLICATION NO. | : 17/685327 | |
| DATED | : November 19, 2024 | |
| INVENTOR(S) | : Yosuke Adachi | |

It is certified that error appears in the above-identified patent and that said Letters Patent is hereby corrected as shown below:

On the Title Page

Add:
-- (30) Foreign Application Priority Data
Mar. 31, 2021 (JP) ......................... 2021-033839 --

Signed and Sealed this
First Day of April, 2025

Coke Morgan Stewart
*Acting Director of the United States Patent and Trademark Office*